US008332866B2

(12) United States Patent
Kelley et al.

(10) Patent No.: US 8,332,866 B2
(45) Date of Patent: Dec. 11, 2012

(54) METHODS, SYSTEMS, AND APPARATUS FOR OBJECT INVOCATION ACROSS PROTECTION DOMAIN BOUNDARIES

(75) Inventors: Brian H. Kelley, San Diego, CA (US); Kristopher Scott Urquhart, Poway, CA (US); Ramesh Chandrasekhar, San Diego, CA (US); Robert Garrett Walker, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1284 days.

(21) Appl. No.: 11/946,227

(22) Filed: Nov. 28, 2007

(65) Prior Publication Data

US 2008/0126762 A1   May 29, 2008

Related U.S. Application Data

(60) Provisional application No. 60/867,787, filed on Nov. 29, 2006.

(51) Int. Cl.
*G06F 9/44* (2006.01)
*G06F 15/167* (2006.01)
(52) U.S. Cl. .......................... 719/312; 719/315; 719/330
(58) Field of Classification Search .......................... None
See application file for complete search history.

(56) References Cited

U.S. PATENT DOCUMENTS

| 6,131,126 | A  | * | 10/2000 | Kougiouris et al. | 719/330 |
|---|---|---|---|---|---|
| 6,151,639 | A  | * | 11/2000 | Tucker et al. | 719/316 |
| 6,708,223 | B1 | * | 3/2004 | Wang et al. | 719/315 |
| 6,832,266 | B1 |   | 12/2004 | Shaylor | |
| 7,788,314 | B2 | * | 8/2010 | Holt | 709/201 |
| 2004/0154020 | A1 | * | 8/2004 | Chen et al. | 718/107 |

FOREIGN PATENT DOCUMENTS

| JP | 3224044 A | 10/1991 |
|---|---|---|
| KR | 1020010041293 | 5/2001 |
| WO | WO9944126 A2 | 9/1999 |

OTHER PUBLICATIONS

Haeberlen A., Liedtke J., Yoonho Park, Reuther L., Uhlig V.; "Stub-Code Performance is Becoming Important"; Oct. 22, 2000; Karlsruhe University, Germany.* Database Inspec (Online) The Institution of Electrical Engineers, Stevenage, GB; Oct. 22, 2000, Haeberlen A. et al.: "Stub-code performance is becoming important" XP002475827, Database accession No. 6930779.
Liedtke J.: "Improving IPC by Kernel Design" Operating Systems Review, ACM, New York, NY, US, vol. 27, No. 5, Dec. 1, 1993, pp. 175-188, XP000418692, ISSN: 0163-5980.
Michael Padovano: "Networking applications on UNIX System V Release 4" 1993, Prentice Hall, Inc., Englewood Cliffs, New Jersey 07632, U.S.A., XP002475826.
International Search Report—PCT/US07/085878, International Search Authority—European Patent Office—Apr. 28, 2008.
Written Opinion—PCT/US07/085878, International Search Authority—European Patent Office—Apr. 28, 2008.
Translation of Office Action in Korean application 10-2009-7013633 corresponding to U.S. Appl. No. 11/946,227, citing KR20010041293 dated Mar. 3, 2011.

\* cited by examiner

*Primary Examiner* — H. S. Sough
*Assistant Examiner* — Umut Onat
(74) *Attorney, Agent, or Firm* — Fariba Yadegar-Bandari; James T. Hagler

(57) ABSTRACT

Methods, apparatus, systems, and computer program products for invoking remote process calls and facilitating inter-process communications in a protected memory system employ a kernel that supports remote invocation of objects by a system call. The system call may include an object identifier and a set of pointers to input and output buffers. The kernel locates the specified object in a separate server process domain and awakens a server thread within the server domain to invoke the object. Using provided memory pointers, the kernel can copy input and output data across the protection domains in a single step without the need for copying data into an intermediate buffer. This eliminates the overhead of multiple data copy steps that are required in conventional protected memory systems.

20 Claims, 18 Drawing Sheets

METHODS, SYSTEMS, AND APPARATUS FOR OBJECT INVOCATION ACROSS PROTECTION DOMAIN BOUNDARIES

CLAIM OF PRIORITY UNDER 35 U.S.C. §119

The present Application for Patent claims priority to Provisional Application No. 60/867,787 entitled "METHODS, SYSTEMS, AND APPARATUS FOR OBJECT INVOCATION ACROSS PROTECTION DOMAIN BOUNDARIES" filed Nov. 29, 2006, and assigned to the assignee hereof and hereby expressly incorporated by reference herein.

FIELD OF THE INVENTION

The described aspect relate to data processing methods, and more particularly to methods and systems for efficiently invoking objects and copying data across protection domain boundaries in a computer system divided into different protection domains.

BACKGROUND

Computer systems implementing protected mode operating systems segment physical memory into separate virtual address spaces or regions that are accessible by certain processes or protection domains. Some memory may be allocated to and accessible only by the computer system's kernel, referred to as kernel space or the kernel domain, while other memory is made accessible by applications, referred to as user space or a user domain. When multiple processes are running simultaneously, each process is allocated its own virtual memory space or memory domain, and unless explicitly provided, cannot access the memory domain of other processes. This protection of memory domains improves system reliability by reducing opportunities for processes to interfere with each other or the operation of the system.

In many operations, a user process in one protection domain may need to call or access an object or function located (i.e., stored or running) in another protection domain. In such situations, the system needs to enable communications across the respective protection domains. A number of methods for providing such inter-process communications include "pipes," kernel services, message passing, virtual memory remapping, and shared memory. However, such traditional methods exhibit undesirable inefficiencies.

For instance, a protection domain system may implement pipes to provide inter-process communication by first copying data from one user protection memory domain into the kernel domain, and then copying the same data from the kernel domain into the memory space of another user protection domain. In the case of a remote object call where input and output data need to be communicated, this process is repeated when the output data is returned across the protection domains to the process that initiated the remote object call. Thus, inter-process communication using pipes is inefficient as two separate copy operations are involved in each direction.

Shared memory may also be used for inter-process communications; however, implementing shared memory requires that the two protection domains agree upon a non-generic data-sharing scheme. Notably, agreeing upon a non-generic data-sharing scheme is not easily accomplished since the invoking process needs to predict the manner the receiving process will receive the data.

SUMMARY

The various aspects provide methods and systems for efficiently invoking remote process calls and facilitating inter-process communication in a protected memory architecture system. In one aspect, a kernel is provided that supports remote invocation of objects by a system call. Such a system call may include an object identifier, and a set of memory pointers to input and output buffers. Using the system call, the kernel can locate the specified object in a server process domain and awaken a server thread within the server domain to invoke the object. Using provided memory pointers, the kernel can copy input data into the server process and copy output data from the server process to the client process.

In another aspect, one or more additional system calls may be implemented to allow the server thread to request input data and respond to the completed requests. In one implementation, the system call allows an invoked server process to copy input data into a specific address, or to fill an output buffer with specified data. In one aspect, the kernel can copy the argument, validate the request in the context of the remote object invocation, and use the input and output descriptions provided by the client process. In one implementation, the invoked object may be allowed to read from the client input buffers (not from any other client memory) and write to the client output buffers (not to any other client memory).

In yet another aspect, the invoked object may reside either in the kernel domain or a server process domain. In another aspect, the arguments in the system call to the kernel may include object references that confer the objects with the ability to invoke other objects (e.g., capabilities, etc.). In another aspect, the kernel may copy a limited amount of input data during initiation of the invocation and a limited amount of output data during the termination of the procedure call. In still another aspect, arguments may be placed in a shared memory buffer that is associated with each invoking thread, allowing the data to be readable and writable by the protection domain of the invoked object.

BRIEF DESCRIPTION OF THE DRAWINGS

The disclosed aspects will hereinafter be described in conjunction with the appended drawings, provided to illustrate and not to limit the disclosed aspects, wherein like designations denote the elements.

DETAILED DESCRIPTION

Figure 1:
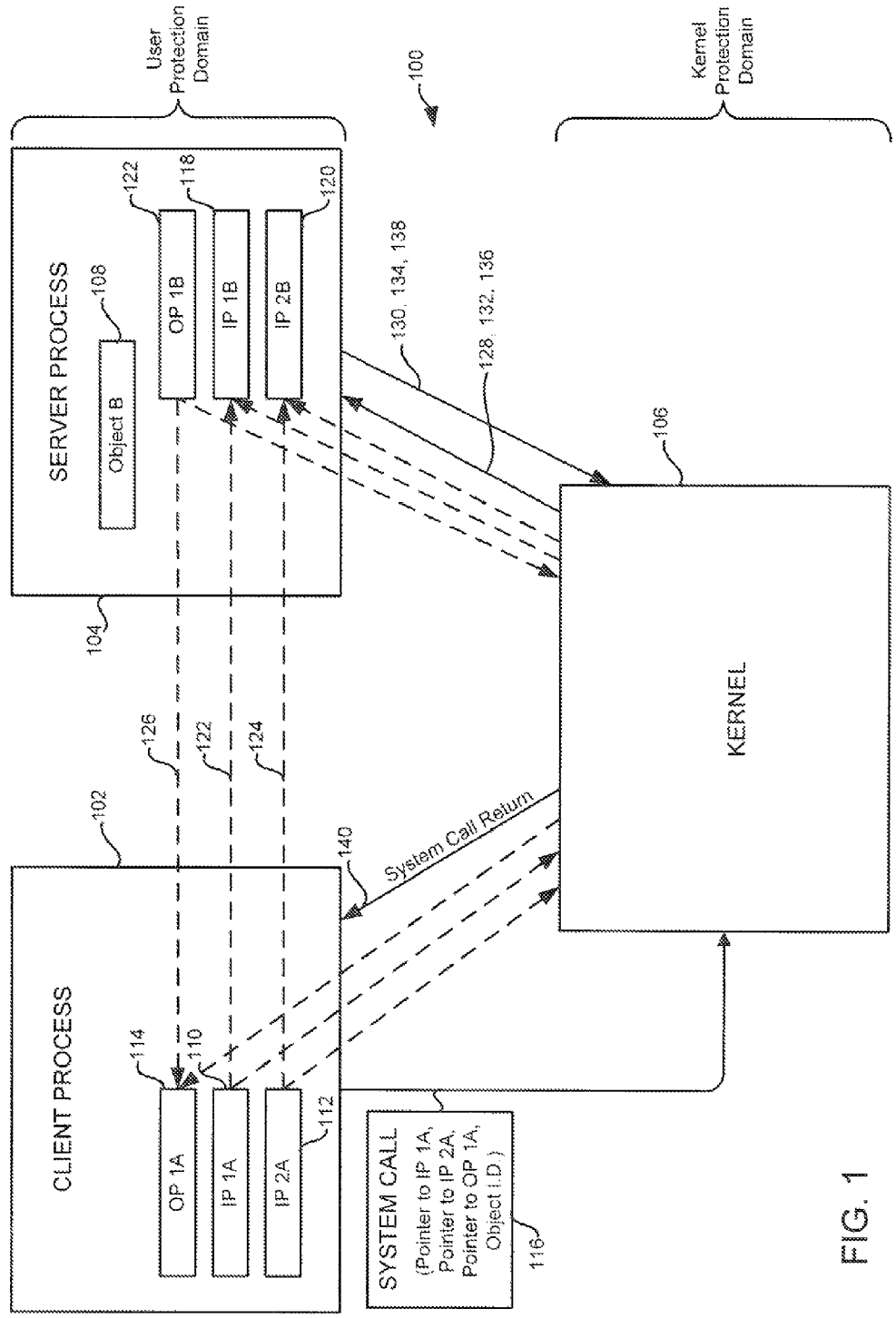
FIG. 1 is a schematic representation of a program state of a computer system divided into different protection domains, according to one aspect.

The present systems, devices, apparatus, methods, computer program products, and machine-readable medium will be described in more detail hereinafter with reference to the accompanying drawings, in which described aspects are shown. The systems, devices, apparatus, methods, and machine-readable medium, however, may be embodied in many different forms and should not be construed as limited to the aspects set forth herein; rather, the present aspects are provided so that the subject disclosure will be thorough and complete, and will convey the scope of the invention to those skilled in the art. Like numbers refer to like elements throughout.

In addition to the foregoing, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The term "kernel" as used herein refers to trusted processes within a memory protection processor architecture, as will be understood by one of skill in the art. In computer science, the kernel is typically the central component of computer operating systems responsible for managing system resources, including the communications between software processes and hardware elements. Thus, a kernel may be an operating system or one or more kernels within a microkernel architecture, as would be understood by one of ordinary skill in the computer science arts.

For ease of description, references herein to "client processes," "user processes" and "server processes" are used to indicate separate process and memory domains within a protection domain system. In particular, references to "client process" and "user process" are intended to identify a source of a function call or invocation of a remote object, operation or method, while the term "server process" is intended to identify a separate process or memory domain that hosts the invoked object, operation or method not directly accessible to the client process. Such separate processes and domains may be contained within the same computer (i.e., process and memory). Thus, references to "client" and "server" should not be understood to limit the claims to a particular client-server architecture or to refer to separate processors or networked processors.

Reference is made herein to processes and the kernel "executing system calls," "sending" and "communicating" messages to each other. Such references are intended to encompass all methods known in the computer arts for coordinating operations between separate processes within a system. As one of ordinary skill in the art will appreciate, such methods include setting flags in memory, storing particular values in memory (such as a processor stack), indicating a change of state in a state machine, sending or setting an interrupt to a process, transmitting symbols across protection domains, etc. For ease of description, the execution of a system call may be referred to as "sending" or "communicating" a message to reflect that requests and information are being passed between protection domains, even though the "sending" and "receiving" processes are executing within the same physical processor and memory space. Thus, references to "communicating" or "sending" messages should not be understood as limiting the description or the scope of the claims to a particular type of communication or message protocol, nor a involving a different type of inter-process communication than the "execution" of a system call.

As used herein, the term "buffer" refers to a memory location in which particular data can be stored, such as a memory address within a larger random access memory. As used herein, the terms "protection domain" and "domain" refer to memory address space allocated to particular processes, which may be memory addresses within a larger random access memory. References to buffers, protection domains, and domains are not intended to imply that a separate memory device is required, although the various memory locations may lie within separate random access memory chips and disc drives within the system.

In one aspect, a kernel is provided in a system with a memory protection architecture that supports remote invocation of an object by providing a system call for synchronous invocation of objects external to a calling process. As arguments, the system call accepts or includes an identifier for the object being invoked, a set of pointer(s) to input buffer(s) containing data to be made available to the invoked object, and a set of pointer(s) to output buffer(s) into which the invoked object may store data. An exemplary system call may appear as: SysCall (INVOKE, nObjID, input buffer, output buffer). Using the system call, the kernel can locate the specified object in a separate server domain and awaken a server thread within the server domain to invoke the object.

In overview, one or more described aspects provide kernel operations which enable efficient, synchronous inter-process communications and remote object call extractions in a memory protection system architecture. According to one or more aspects, the methods may be implemented within a kernel, or in other systems that do not strictly enforce memory protection but simulate it. The various aspects may be implemented on any computer-based system featuring a protected memory architecture, but are particularly applicable to systems having limited processor capacity, such as consumer electronics. A noteworthy aspect is a mobile handset (e.g., a cellular telephone) having a processor and memory implementing an operating system implementing one or more of the aspect methods in a protected memory architecture.

Figure 2:
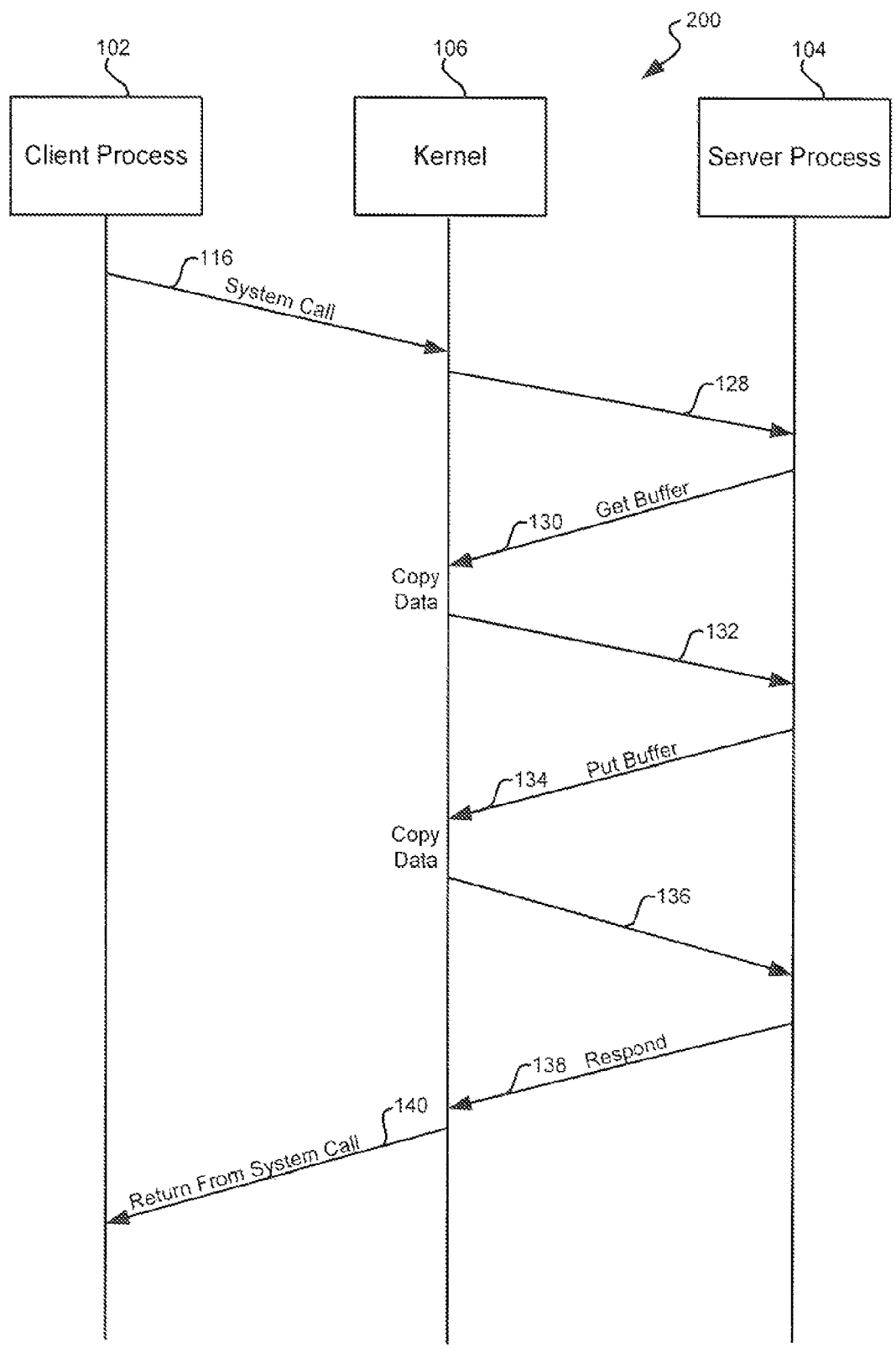
FIG. 2 is an invoke flow diagram of communications among processes in the aspect illustrated in FIG. 1, according to one implementation.

FIG. 1 provides a schematic diagram representation of a program state 100 of a computer system divided into different protected memory domains according to one aspect. The system includes a kernel 106 having a kernel protection domain and client and server processes 102 and 104 each having memory protection domains. FIG. 2 is an invoke flow diagram 200 illustrating communications between the client and server processes 102, 104 and the kernel 106. An example of operation steps of a method implementing this embodiment are illustrated in the process flow diagram shown FIG. 3.

Figure 3:
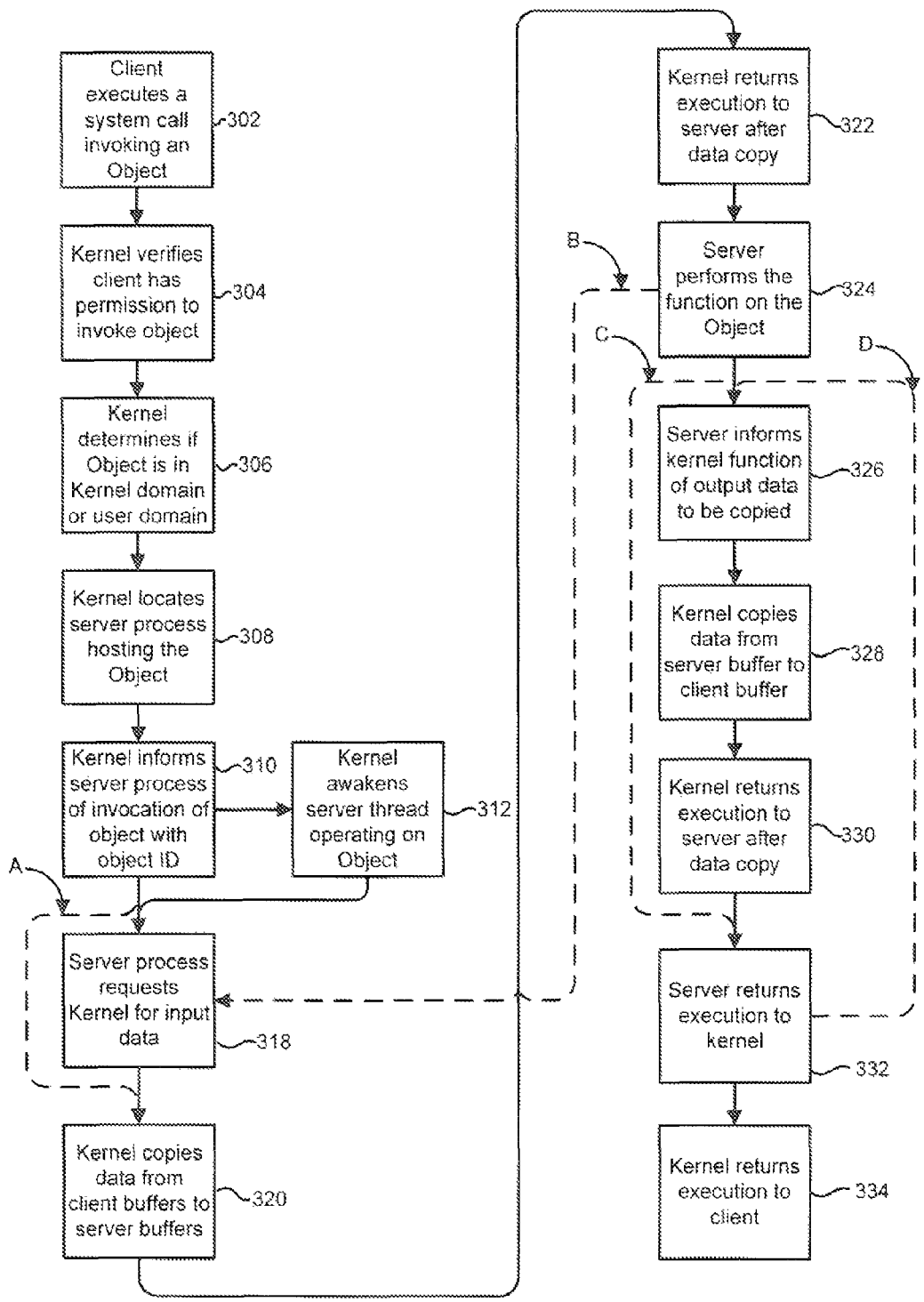
FIG. 3 is a process flow diagram of an example method for implementing the aspect illustrated in FIG. 1, according to one aspect.

Referring to FIGS. 1, 2 and 3 together, the client process 102 invokes a function that operates on a remote object B 108 residing in the server process 104, by executing a system call 116 to the kernel 106, step 302. As arguments in the system call 116, the client process 102 includes as arguments, the local object identifier of the object B 108, and memory pointer(s) to the buffer address(es) in the client process memory space containing the input data required by the invoked object. The system call 116 may also include memory pointer(s) to the buffer address(es) in the client process memory space into which output data passed from the invoked object should be copied. In the exemplary aspect illustrated in FIG. 1, the client process 102 issues a system call 116 asking the kernel 106 to invoke object B 108 in the server process 104, a function which requires two inputs stored in buffers 110, 112. Of course, in various aspects, any number of buffers may be used, with the associated address pointers included in the system call 116.

Upon execution of the system call 116, the kernel 106 first validates that the process invoking the object (i.e., executing the system call) has permission to invoke the object, step 304. If the client process does have permission to invoke the object, then the kernel 106 determines whether the object B 108 is an object residing in the kernel domain or in a user domain, step 306. The kernel 106 is able to locate the object 108 because the kernel keeps track of the relationships between objects and the various protection domains. The kernel 106 can keep track of object locations by any of a number of methods, including for example maintaining a table for each client/server process that identifies objects with an identifier (e.g., an index into the table) and a pointer to the object interface. As another example, the kernel 106 may maintain a global table of objects within the system that maps object identifiers to processor domains and pointers to the object interface. As another example, the kernel 106 may maintain a hashing to associate (i.e., map) user processes with objects. As will be appreciated by one of ordinary skill in the art, the capability to map objects to processes is a common feature of kernels in protected memory architectures. For example, Unix kernels can keep track of open sockets held by processes.

If the kernel 106 determines that the object B 108 does not reside within the kernel 106, the kernel 106 locates the server process 104 hosting the object B 108, step 308. As will be appreciated by one of skill in the art, the kernel 106 may determine the location and server process of an invoked object in one operation (e.g., by locating the object in a global table as described above), and therefore steps 306 and 308 may be combined.

Once the kernel 106 determines the location of the object B 108, the kernel sends a message 128 informing the server process 104 of the remote invocation of the object by the client process 102, step 310. This communication can include the object ID provided by the client process 102 in the system call. In one aspect, the server process 104 may have a predetermined buffer location known to the kernel 106 for receiving the object ID. In one aspect, the kernel 106 awakens a server thread (not shown separately in FIG. 1) within the server process 104 which operates to invoke the object B 108, step 312. As will be appreciated by one of ordinary skill in the art, the server thread can be awakened by any appropriate well known method. In one aspect, the kernel 106 provides the object ID to the server process 104, step 316.

The server process 104 then may request input data from the kernel 106, such as by executing a Get Buffer 130 operation, step 318. This Get Buffer 130 operation requests input data associated with the client process's invocation request, and provides pointers to input buffers 118 and 120 within the server process domain into which the input data is to be copied. By including pointers to the input buffers 118 and 120 with the Get Buffer operation 130, the server process 104 informs the kernel 106 of the destination location(s) at the time the data is requested. This enhances system flexibility, since the server process 104 does not need to set aside memory for receiving argument inputs, which are difficult for a developer to anticipate in terms of size (object input data requirements vary) and timing.

In some implementations, as discussed in more detail below, the server process 104 may have a predetermined buffer location known to the kernel 106 for receiving input data (sometimes referred to as a "landing pad" for arguments). This implementation allows the kernel 106 to invoke an object and pass the requisite arguments in a single step, thereby obviating the need for the Get Buffer execution step. This alternative is illustrated by the dashed arrow A in FIG. 3.

Upon receiving the input data request 130 from the server process 104, the kernel 106 can copy data residing in the client process buffers 110 and 112 to the server process's buffers 118 and 120, step 320. In doing so, the kernel copies the data directly from the client process buffers 110 and 112 to the server process buffers 118 and 120, correspondingly, in a single step, as illustrated in FIG. 1 by the dashed lines 122 and 124, respectively. The kernel 106 can directly copy data from the client process 102 into the server process 104 because the kernel 106 has read and write access to the client process and server process memory spaces. This unlimited read and write access is a capability of the kernel 106. As such, the kernel 106 can use the client buffer pointers passed to the kernel 106 in the system call 116 to obtain the input data directly from the client process 102 input buffers 110 and 112. Similarly, the kernel 106 can write the input data directly into the server process 104 input buffers 118 and 120 using pointers to those memory locations provided in the Get Buffer 130 message (or to predefined memory locations in some aspects). This direct copying of input data from the client memory domain buffers 110 and 112 to the server memory domain buffers 118 and 120 appears to the client and server processes 102, 104 as a direct copy operation, as illustrated by dashed lines 122 and 124.

It is worth noting that the server process 104 is able to execute the Get Buffer operation 130 for input data 1A and 1B contained within the client process buffers 110 and 112, because the server process 104 is in the midst of responding to the client process's invocation of object B 108. This invocation informs the server process 104 of the availability of input data, and thus prompts the issuance of the Get Buffer 130 operation, step 318. The Get Buffer 130 operation can be performed by the kernel 106 because permission to read the data contained within the buffers 110 and 112 of the client process 102 has been granted by the client process 102 for the duration of the invoked operation. In one or more aspects described in more detail below, the server process 104 may also be granted temporary read access to the input data buffers 110 and 112 as part of the object invocation. This may be implemented by the API used in executing the service call 116 providing temporary access to memory to the service process 104 for the duration of the service call. In one or more aspects, this read permission is granted for a limited time, particularly, for the duration of the client process' invocation of object B 108.

Once the data contained within the client process input buffers 110 and 112 have been copied to the server process input buffers 118 and 120, the kernel 106 returns control of execution back to the server process 104 by a message 132, step 322. At this point, the server process 104 may request more input data, such as by executing another Get Buffer 130 to request data from the kernel 106, thus repeating step 318 as illustrated by the dashed arrow B in FIG. 3. The server process 104 can execute multiple Get Buffer 130 requests in order to copy in a large amount of input data. Each Get Buffer 130 request may, for example, identify pointers to different buffer locations, such as to populate a table within the server process 104. Also, the server process 104 may execute multiple Get Buffer 130 requests while performing the called function on the identified object B 108. The kernel 106 responds to each Get Buffer 130 request as described above with reference to steps 320 and 322. This capability provides flexibility to the application developer to optimize transfer of data from the client process 102 into the server process 104 without requiring modifications to the kernel 106 or client process 102 software.

Once all input data has been copied into the server process input buffers 118 and 120, the server process 104 can begin the call operation on the object B 108, step 324. When the server process 104 has performed the called function on the identified object 108, the server process 104 notifies the kernel 106 of output data to be copied, such as by executing a Put Buffer request 134, step 326. The Put Buffer 134 message passes execution to the kernel 106 to copy output data contained within the server process output buffer(s) 122 into the client process domain. The Put Buffer 134 message includes pointer(s) to the server process 104 output buffer(s) 122. From pointers contained within the initial system call 116, the kernel 106 knows the memory locations of the client process output buffer 114. So notified, the kernel 106 can directly copy data residing in the server process output buffer 122 to the client processor output buffer 114, step 328. This direct copying of output data from the server memory domain output buffer 122 to the server memory domain output buffer 114 appears to the client and server processes 102 and 104 as a direct copy operation, as illustrated by the dotted line 126 in FIG. 1. In some implementations, the server process may place output data in predefined memory locations known to the kernel 106, thus obviating the need for the Put Buffer operation.

Once the kernel 106 has copied the output data into the client process output buffer 114, the kernel 106 returns control of execution back the server process 104 by message 136, step 330. As with the Get Buffer 130 operation, the server process 104 may execute multiple Put Buffer 134 messages (as illustrated by the dashed arrow D), repeating step 326, thereby prompting the kernel 106 to repeat steps 328 and 330, as described previously. Each Put Buffer 134 request may, for example, identify pointers to different output buffer locations, such as to read out a table within the server process 104. This allows the server process 104 to send large amounts of data block to the client process 102, such as what may occur in a data block memory read operation. This capability provides flexibility to the application developer to optimize the transfer of output data from the server process 102 into the server process 104 without requiring modifications to the kernel 106 or client process 102 software, advance knowledge of the size of the output data block, or arbitrary restraints on the allowable size of output data blocks.

When the system call invoking object B 108 is complete, the server process 104 returns execution to the kernel 106 by message 138, step 332. Since some objects 108 may not output data, such as a remote call to activate another process or a device indicator (e.g., a display or LED), the server process 104 may bypass outputting data (steps 326-330) and simply return control of execution to the kernel 106, message 138 and step 332, as illustrated by the dashed arrow C in FIG. 3. Returning control of execution prompts the kernel 106 to return execution control 140 to the client server 102, step 334. At this point, the remote object invocation is complete.

As one of ordinary skill in the art will appreciate, the above described process-to-process single step copying of data is made possible because the kernel has open access rights to all objects and resources of the system. The client process 102 and server processes 104 can only access objects and resources associated with their respective memory address spaces. In contrast, the kernel 106 can obtain the data within the client process input buffers 110 and 112 because the kernel 106 has the right to read and write data in the client process memory address space. In the same manner, the kernel 106 can write the data directly into the server process input buffers 118 and 120, because the kernel 106 has the right to read and write data to the server process memory address space. Consequently, the aspect illustrated in FIGS. 1-3, substantially eliminates two data copying operations (i.e., copying input data into a kernel buffer and copying output data into a kernel buffer) that are otherwise required. This reduces system overhead, particularly for remote operations involving the movement of significant amounts of data.

One of ordinary skill in the art will also appreciate that in the foregoing aspect, the kernel 106 can copy data from one process domain to another process domain without having to allocate any of the kernel's buffer space to temporarily hold the data being copied. In other words, in this aspect, the kernel need not copy data out of the client process buffer spaces and into the kernel space and thereafter out of the kernel buffer spaces and into the server process' buffer spaces. This simplifies the kernel architecture while minimizing kernel memory allocations, which can be particularly advantageous for supporting operations involving transfer of large amounts of data, such as may occur in audio and video presentation and copying applications. Thus, by the server process 104 executing multiple Get Buffer 130 and/or Put Buffer 134 operations, the system can pass an unlimited amount of data between protection domains using a small input or output buffer and with limited (if any) allocated kernel memory.

The foregoing aspects provide single move copying of data across protection domains with arbitrary source and destination addressing, with the addressing built into the call arguments. Thus, from the point of view of the client process 102 (and from the perspective of the client process developer), the implementation of a remote object, including copying data across protection domains which is otherwise prohibited by the system, is accomplished efficiently with a single indication call and arbitrary input/output buffers without concern with or rewriting of client or object software.

Additionally, the kernel 106 according to the various aspects supports synchronous invocations of remote objects. This allows the client process 102 to make a synchronous call to an object via the kernel 106 without having to be aware of, or concerned with, details of kernel 106 interactions with the server process 104 (and vice versa). Thus, in order to invoke an object, the client processor 102 need only identify the object being invoked and, in some aspects, grant permission to read and write data to the client process' 102 memory space for the duration of the object invocation operation.

As mentioned earlier, for some objects and some aspects, a service call 116 may activate a thread within the server process 104. In one implementation, the thread may be present in the server process 104 awaiting an invocation of the object B 108. Once the object B 108 is invoked, the corresponding thread is awakened. In another aspect, the kernel 106 can support thread migration. Thread migration refers to one mechanism for synchronizing a service call from a client process domain with the thread executing in a server process. In thread migration, a stack is allocated in the server process 104 and control of execution switches from the client to the server as if the thread had switched protection domains. The execution of the migrating thread can be initiated in the server process 104 as if the client process's 102 thread has changed protection domains for the duration of the invocation.

Figure 4:
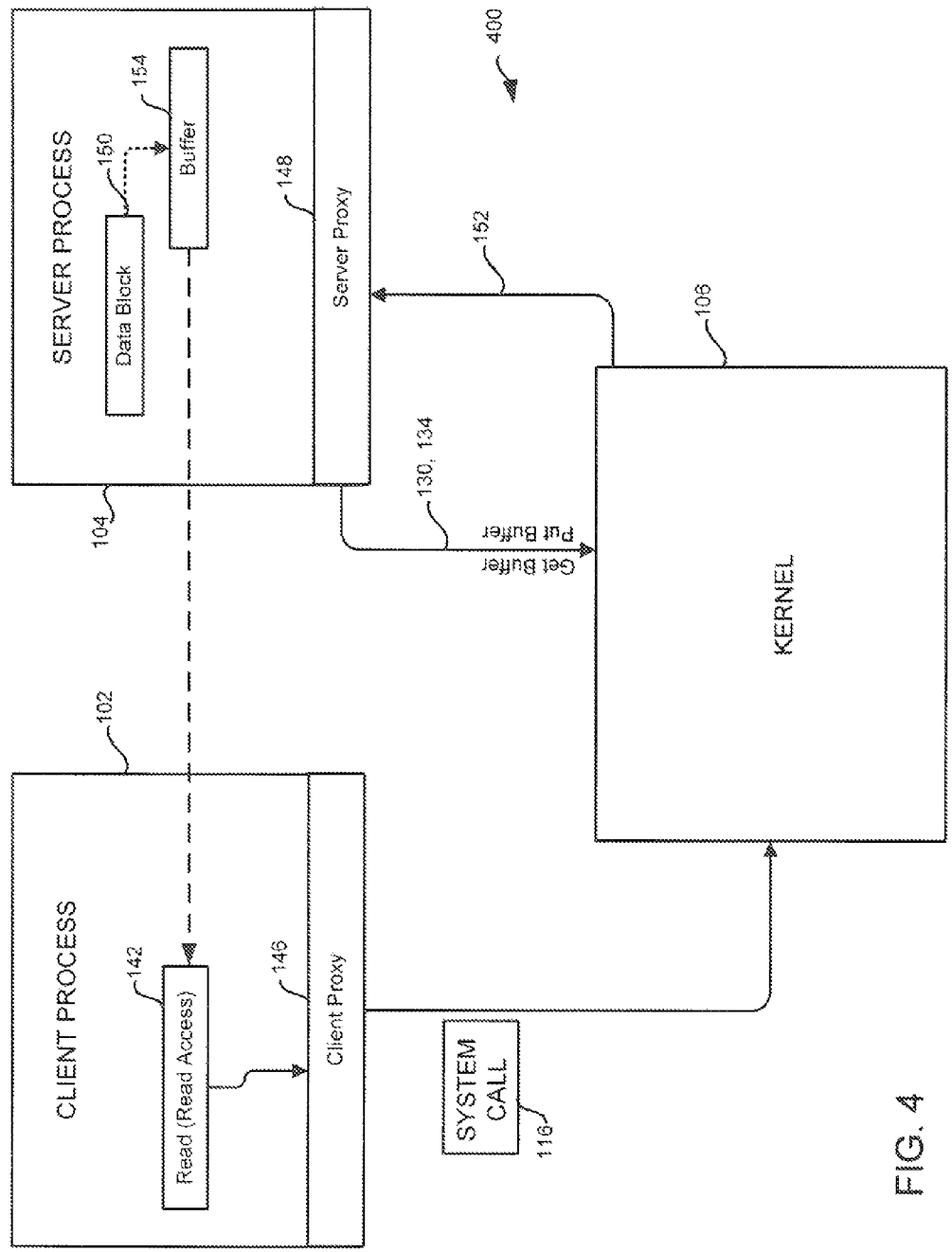
FIG. 4 is a schematic representation of a program state of a computer system divided into different protection domains according to another aspect.
Figure 5A:
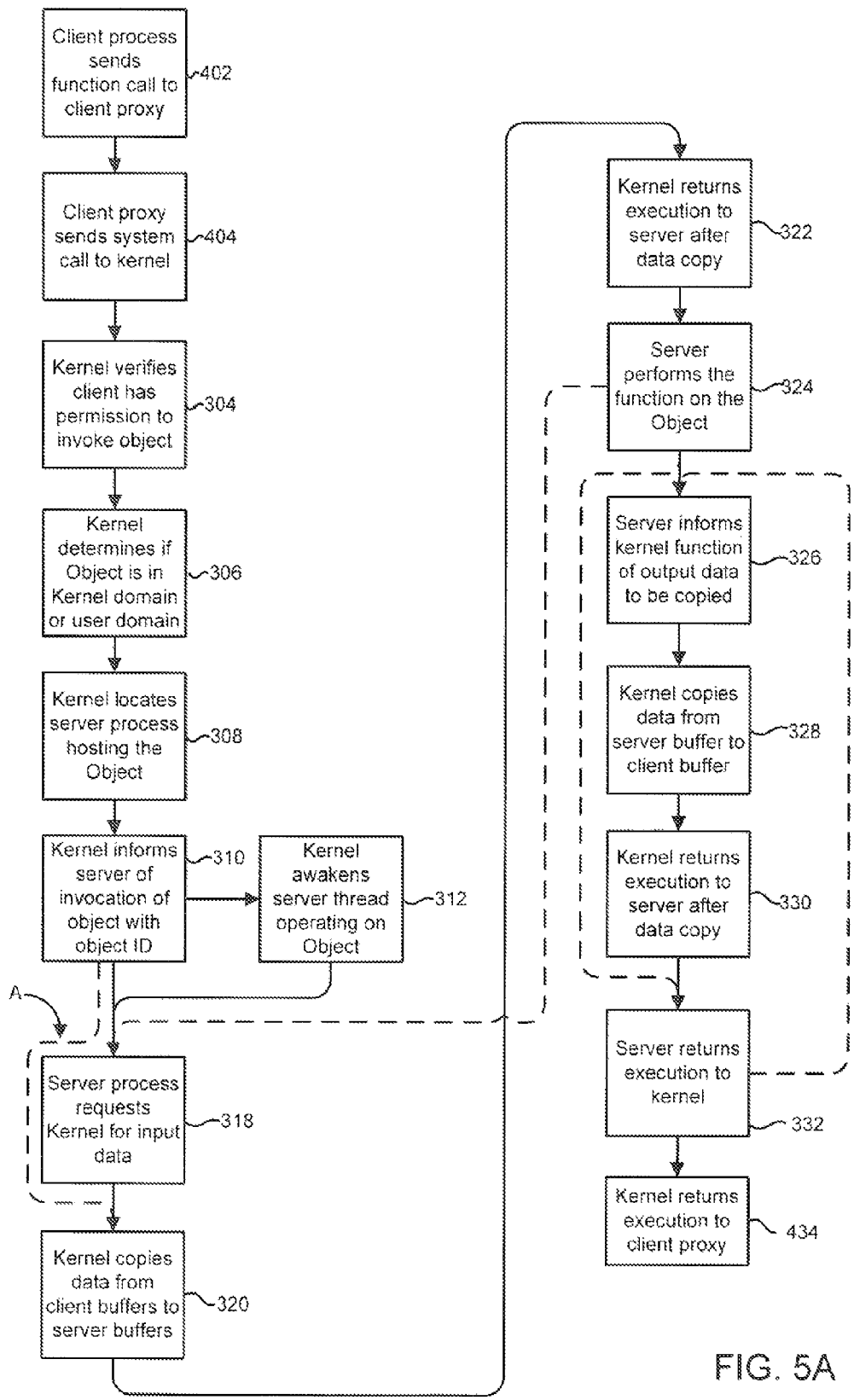
FIGS. 5A and 5B are process flow diagrams of example methods for implementing the aspect illustrated in FIG. 4, according to one aspect.
Figure 5B:
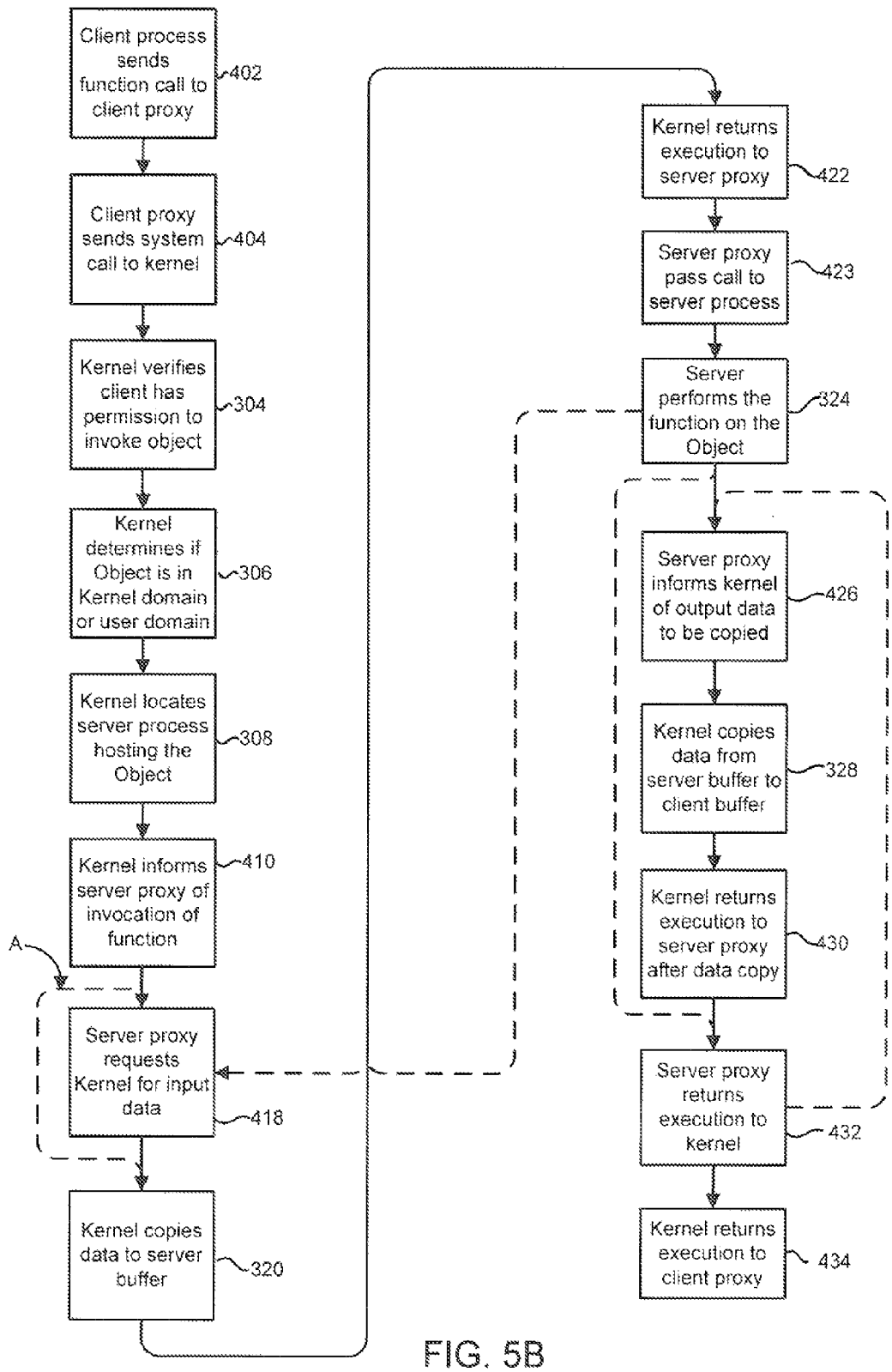

FIGS. 4, 5A, and 5B illustrate alternative aspects in which the details associated with a system call can be hidden from the client process 102 by using a client proxy 146. Similarly, the inter-process data exchange details associated with a server process 104 responding to the system call can be hidden from the server process 104 by using a server proxy 146. The processes of invoking a remote object and passing data between protection domains are similar to the aspect described previously with reference to FIGS. 1-3 with two additions. First, the steps of executing the system call 116, posting input data to an input data buffer, and receiving output data from the kernel 106 can be handled by intermediate software acting as a proxy for the client process 102. Second, the steps of receiving an object call from the kernel 106, generating Get Buffer 130 and Put Buffer 134 operations and handling the input and output date can be executed by intermediate software acting as a proxy for the server process 104. Using a client proxy 146 and a server proxy 148 further simplifies the development of client and server application software, since an application invoking a remote object need only provide the arguments and receive output data in a standard format without regard for how the process will be executed by the kernel.

In the exemplary aspect illustrated in FIG. 4, the system call is a read method 142 invoked by the client process 102 to read a data block 150 stored in system memory within the server process 104 domain. Referring to FIGS. 4 and 5A together, the client process 102 calls a read method 142 on the data block 150 by identifying the operation and the desired data block to the client proxy 146, step 402. The client proxy 146 code resides within the client process 102 domain, and thus has full access to client process memory (i.e., buffer) space. The client proxy 146 code marshals the name of the remote invocation and the arguments of the remote invocation into a system call 116 which it sends to the kernel 106, step 404. This aspect allows the client process 102 to call the read method 142 on the data block 150 as if the data block 150 resides within the client process 102 domain of system memory.

In operation, the client process 102 makes the read method call 142 to the client proxy 146, passing the arguments necessary for the read method 142, step 402. The client proxy 146 packs the arguments into the system call 116 and executes the system call 116 passing control of execution to the kernel 106, step 404. In an exemplary aspect, the system call 116 generated by the client proxy 146 is an INVOKE system call that includes the object identifier and pointers to input and output data as arguments. For example, the call may be: SysCall (INVOKE, nObjID, inputs pointer, outputs pointer). The input data may further include the size of the data block object. As can be appreciated, the read method called by the client process 102 directly corresponds to the INVOKE system call generated by the client proxy 146.

The remainder of the process proceeds in a manner similar to that described above with reference to FIGS. 1-3. Accordingly, the descriptions above of FIG. 3 are incorporated here for like numbered steps illustrated in FIG. 5A. At the conclusion of the invoked operation, the kernel 106 returns control of execution to the client proxy 142, step 434.

In another aspect illustrated in FIGS. 4 and 5B, a server proxy 148 within the server process 104 domain manages communications between the kernel 106 and the server process 104. In this aspect, the kernel 106 communicates with the server proxy 148 which acts as an intermediary gathering data required by the server process 104 for the invoked operation. The invoked object may request data, such as by passing an IRemoteCall interface pointer to the server proxy 148 for example. As will be appreciated by one of ordinary skill in the art, the server proxy 148 can then implement a function call that directly corresponds to the remote invocation call packed within the request message 152.

Much of the steps illustrated in FIG. 5B proceed in a manner similar to that described above with reference to FIGS. 1-3 and 5A. Accordingly, the earlier descriptions with respect to of FIGS. 3 and 5A are incorporated here for like numbered steps illustrated in FIG. 5B. The kernel 106 informs the server proxy 148 that the object is being invoked, step 410, providing with it the object ID. The server proxy may request input data, such as by a Get Buffer 130 call to the kernel 106, step 418, in response to which the kernel 106 copies input data from the client process buffers 110 and 112 into the server process buffers 118 and 120, step 320, as described in more detail earlier with reference to FIGS. 1-3. Alternatively, the server proxy 148 may receive the input data copied by the kernel 106 from the client process 102 input data buffers. When the copy operation is complete, the kernel 106 returns control of execution to the server proxy 148, step 422. When the server proxy 148 has received all the required input data, the server proxy 148 calls the remote object being invoked, step 423. The server process 104 then performs the invoked operation (illustrated as read method 142 in FIG. 4) invoked by the client process 102. The remainder of the process proceeds much as described above with reference to FIG. 3 except that communications with the kernel 106 are managed by the server proxy, steps 430 and 432.

In one exemplary aspect, the data block 150 to be read may be copied into a temporary output buffer 154 within the server process 104. Once the data block 150 is copied into the output buffer 154 in the server process 104, the data is copied to the appropriate output buffer (e.g., buffer 114 in FIG. 1) in the client process 102 by the kernel 106, as illustrated by the dashed arrow in FIG. 4, using the single-step process-to-process copy methods described above with reference to FIGS. 1-3.

The step of temporarily copying data within the server process 104 illustrated in FIG. 4 and described above is not mandatory. In another aspect, the buffer 154 can be defined within the data block 150 itself. In another implementation, the kernel 106 can simply perform a single-step process-to-process copy of data from the data block 150 directly into a buffer in the client process 102 since the kernel 106 has access to both client and server process domains. Thus, implementing client and server proxies 146 and 148 to simplify application development does not need to add overhead to inter-process communications enabled by the various embodiments. This capability of the kernel 106 to perform a single-step process-to-process copy of data substantially eliminates the overhead associated with copying data from a server process 104 into the kernel 106 and out of the kernel 106 into a client process. As discussed previously, enabling single-step process-to-process copying of data is particularly beneficial when large amounts of data need to be copied across protection domains. For a large class of functions, data movement overhead associated with a microkernel architecture can be reduced substantially to zero, because the process-to-process copy can overlap copies that can be implicit in the remote function. For example, when reading from a file system, the process-to-process copy can move the memory directly from the file system cache to the client buffer, requiring only one copy. As a copy operation is implicit in a "read" function, one copy would be required even when the invocation does not have to cross a process boundary.

Figure 6A:
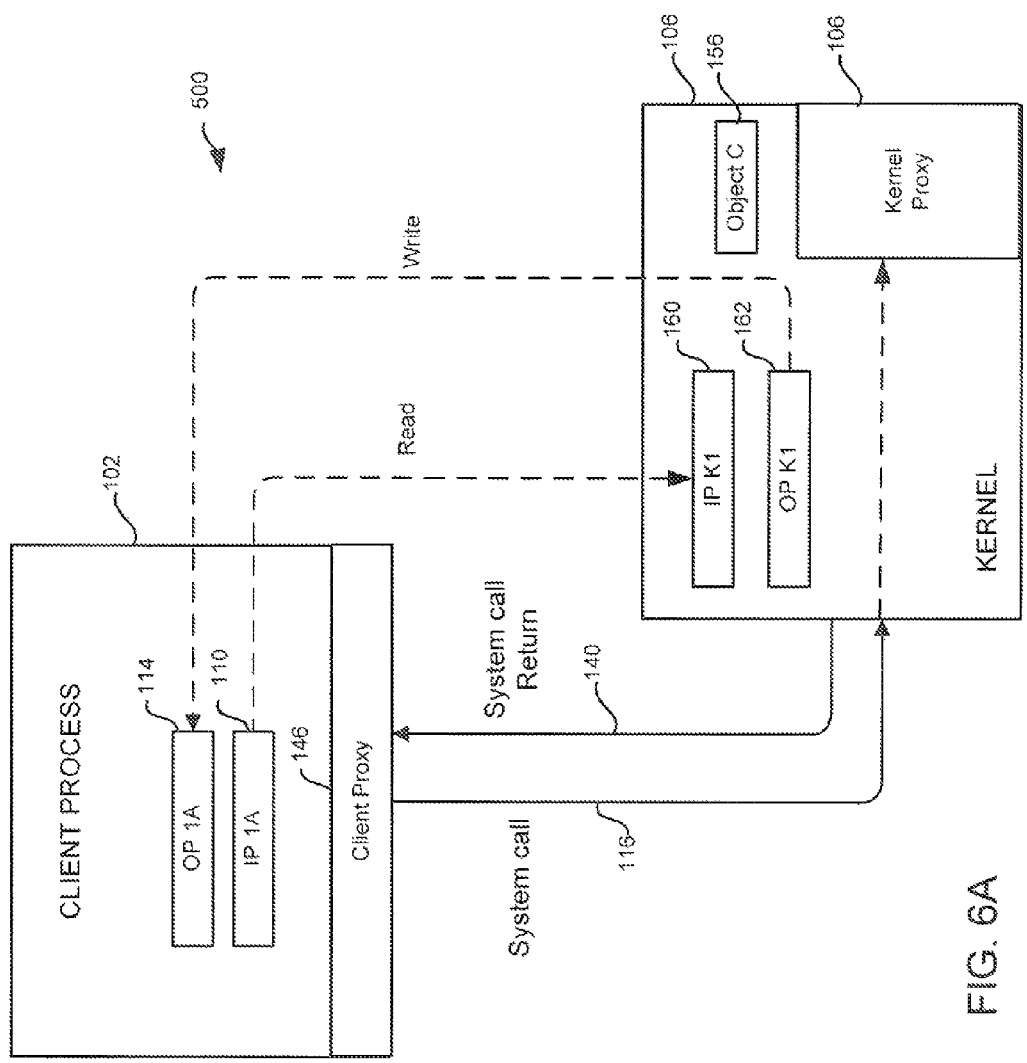
FIGS. 6A and 6B are schematic representations of a program state of a computer system wherein a remote object being invoked resides in the kernel according to another aspect.
Figure 6B:
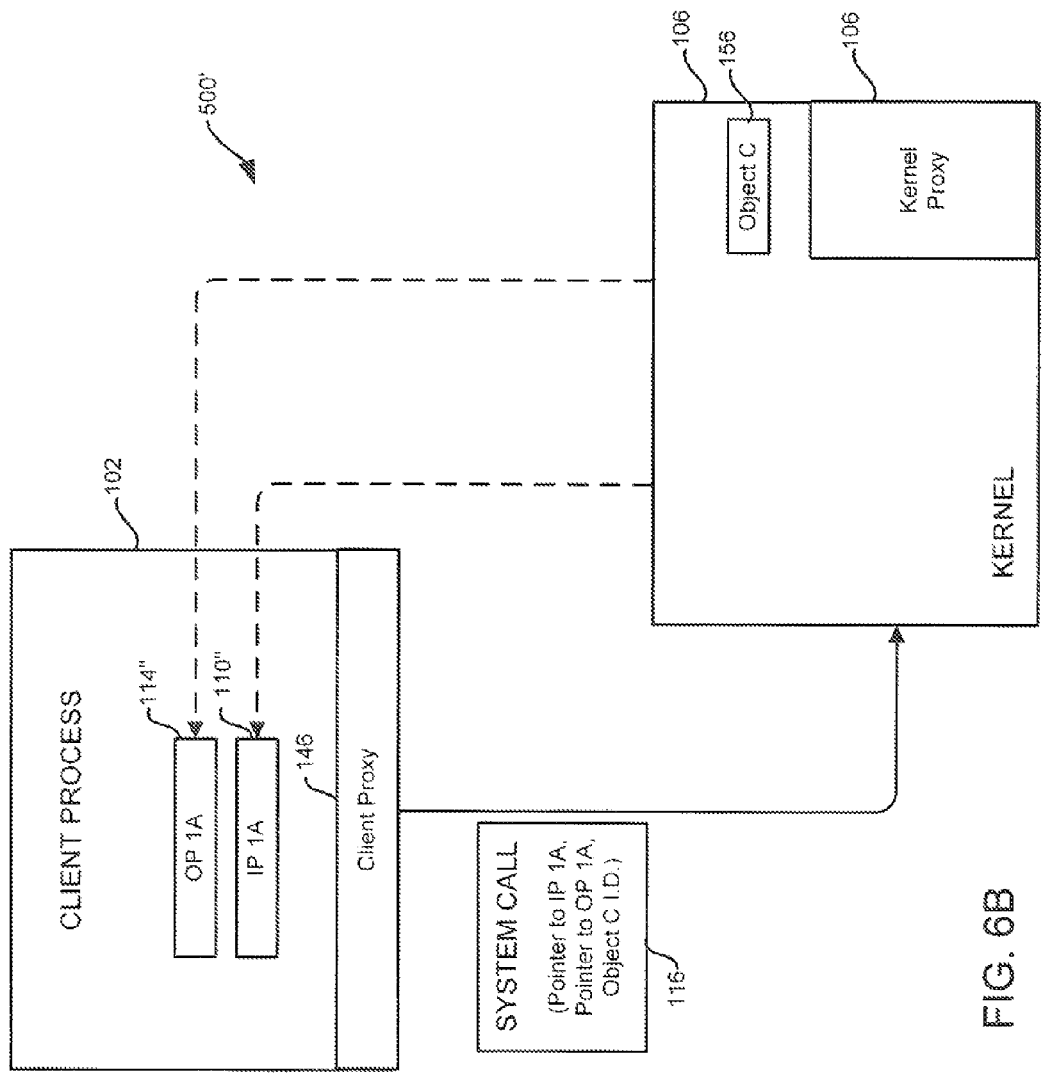
Figure 7:
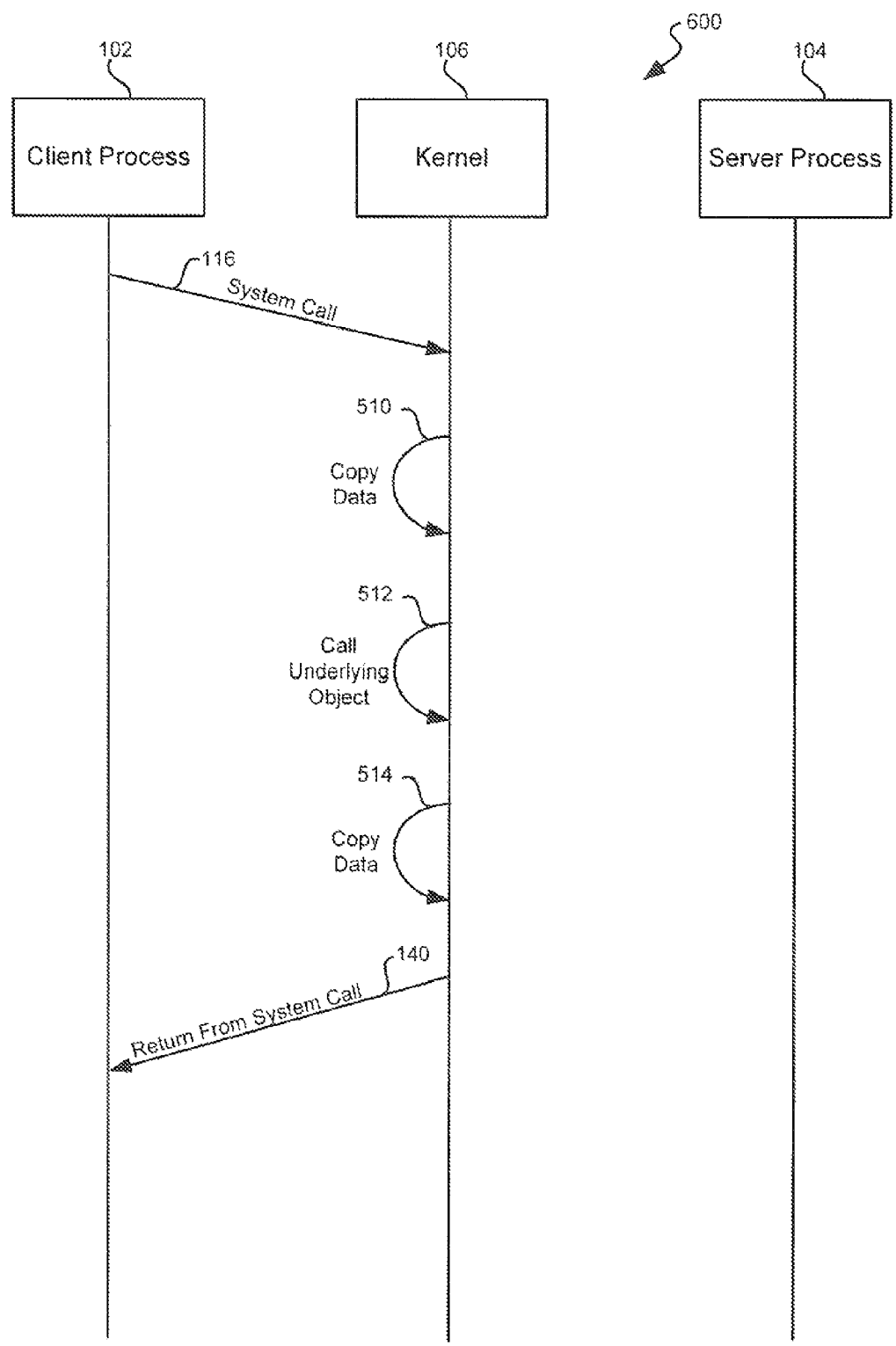
FIG. 7 is an invoke flow diagram of communications among processes in the aspects illustrated in FIGS. 6A and 6B, according to one aspect.
Figure 8:
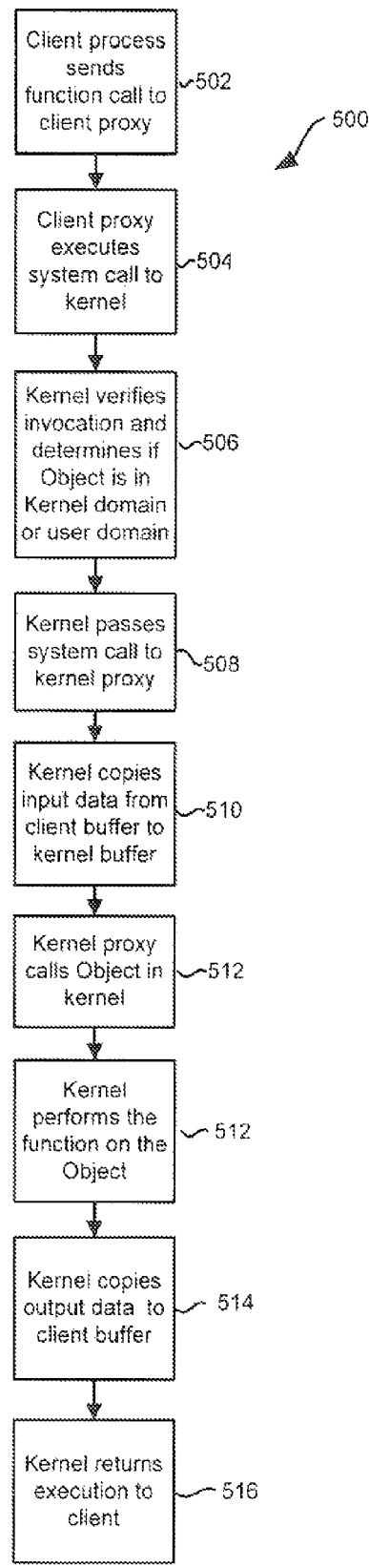
FIG. 8 is a process flow diagram of an example method for implementing the aspect illustrated in FIGS. 6A and 6B, according to another aspect.

In another aspect illustrated in FIGS. 6A-8, a remote object C 156 invoked by a client process 102 resides within the kernel 106, itself. Implementing kernel-based processes in this manner enables the system call 116 initiated by a client process 102 or client proxy 146 to be structurally and functionally the same, regardless of the location of the remote object being invoked. FIGS. 6A and 6B illustrate interrelationships of the memory domains, buffers, and processes involved in this aspect. FIG. 7 is an invoke flow diagram illustrating communications between the client process 102 and the kernel 106. An example of operations steps of this aspect process 500 is illustrated in the process flow diagram of FIG. 8.

Referring to FIGS. 6A-8 together, the client process 102 can execute a system call 116 with the kernel 106 to invoke the remote object C 108 residing in the kernel 106, steps 502-504. As described in more detail above with reference to FIGS. 4 and 5A, in some aspects the client process 102 may do this by sending a function call to a client proxy 146, passing the client proxy 146 the arguments of the function call, step 502. The client proxy 146 then marshals the necessary arguments and generates and executes the system call 116, step 504, including the remote function invocation and the associated arguments and local object identifier of object C 156. For example, in addition to the local object identifier of object C 156, the client proxy 146 can pass a pointer to the client process 102 input buffer 110 containing the input data IP 1A to be made available to the object C 156, and a pointer to the output buffer 114 into which data from the object C 156 can be copied.

After receiving the system call 116 from the client proxy 146, the kernel 106 validates the invocation by confirming that the client has the necessary permission to invoke the object and determines whether the object C 156 is an object residing in the kernel 106 or in a user process, step 506. Once the kernel 106 determines that object C 156 resides in the kernel 106, the kernel 106 may pass control of execution of the system call 116 to a kernel proxy 158, step 508. (It is noted that if the kernel 106 determined that the object resided in a server process domain, the kernel 106 would proceed in a manner similar to that described above with reference to FIGS. 1-5B.) In an example embodiment, the kernel 106 may pass an IRemoteCall interface pointer to a kernel proxy 158, step 508. One of ordinary skill in the art will appreciate that such a function call implemented by the kernel proxy 148 directly corresponds to the remote function invocation of the system call 116. The use of a kernel proxy 158 simplifies the development of objects for implementation within the kernel domain since the object can be programmed to interact with the kernel proxy 158 without the need to be concerned with kernel operation. However, the use of a kernel proxy 158 is not mandatory, and in alternative embodiments the kernel 106 may directly implement the invoked object C 156.

Since the kernel 106 has the authority to read and write data within the client process 102 memory space, the kernel 106 can use the pointers provided in the system call 116 to directly copy input data IP 1A to the kernel input buffer 160, step 510. The kernel proxy 158 may receive the input data and then call the object C 156 being invoked within the kernel 106, step 512. The kernel 106 performs the invoked object (or function or thread), step 512. Output data OP K1 may be temporarily stored to a kernel output buffer 162 (if output data is generated). The kernel 106 then copies the data to the appropriate output buffer in the client server 102 by the kernel 106, step 514. In an alternative embodiment, the kernel 106 can write the data generated by the invoked object directly to the client process 102 output buffer 114, since the kernel has the right to write to the client process 102 memory space. The kernel 106 or kernel proxy 158 then returns control of execution 140 to the client process 102, step 516.

In a variation of this aspect, as illustrated in FIG. 6B, the kernel 106 may read the input data from the client domain buffer 110 and provide the data directly to the invoked object without copying the data to a kernel buffer. This aspect functions in the same manner as described above with reference to FIGS. 6A, 7 and 8 except that there is no need for kernel buffers. Since the kernel 106 has both read and write access to the client process 102 memory space, the kernel 106 can acquire the pointer to the client process input buffer 110 and access the input data IP 1A directly. In one exemplary implementation, the kernel 106 can obtain the pointer to the client process buffers 110 and 114 by using "Acquire In Ptr" and "Acquire Out Ptr" operations, respectively. In this manner, the kernel 106 need not perform any additional copy operations associated with copying data from the client process 102 into the kernel 106 and out of the kernel 106 back into the client process 102.

Figure 9:
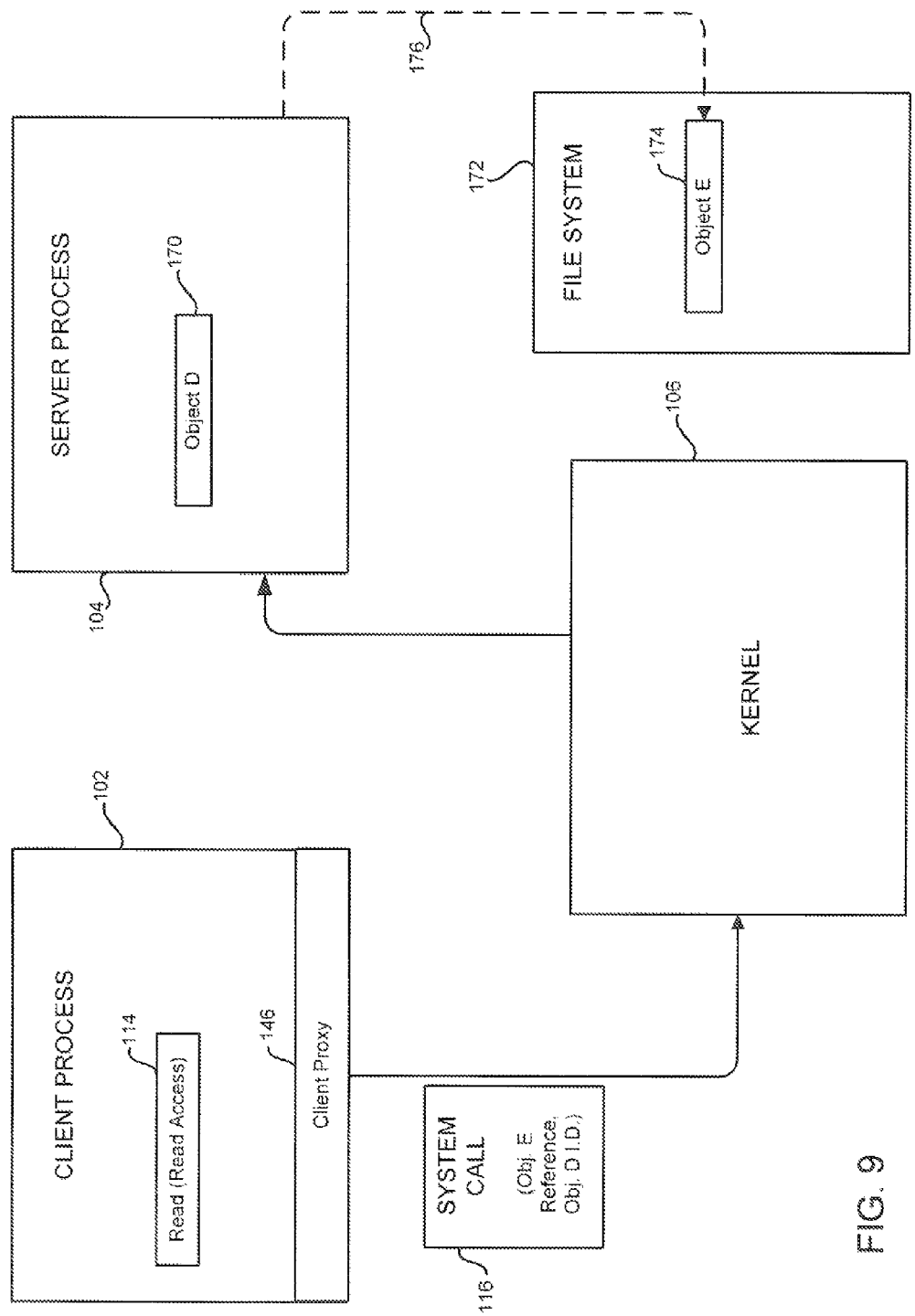
FIG. 9 is a schematic representation of a program state of a system during a remote invocation of a remote object which is granted the authority to directly access an object residing within a data block system according to an aspect.

In another implementation, as illustrated in FIG. 9, a client process 102 can invoke a remote object 170 within a server process 104 domain which can invoke a second object 174 located within a file system memory domain 172. In this implementation, the invoked remote object D 170 is granted the authority to access another object, such as a data block 174 residing within a file system domain 172. Thus, the system call confers the ability to invoke objects (capabilities) in addition to providing arguments and buffer pointers.

Referring to FIG. 9, the client process 102 sends a system call 116 to the kernel 106 requesting the remote invocation of the object D 170 in a manner similar to that described previously with reference to FIGS. 3 and 5A. In addition to the object identifier for the object D 170, the system call 116 further includes an object reference to object E 174 residing within the file system memory domain 172. In this implementation, the object reference confers the remote object D 170 the authority to directly invoke another object E 174. This authority grant is recorded by the kernel 106 which is capable of keeping track of the location of all objects as well as the processes which can access each of the objects. Authorization to invoke another object can also be included as an output parameter in output system calls. Thus, a system call can include an input parameter authorizing the object to invoke another object and/or a system call may include an output parameter that returns to the client process authority to invoke another object.

An exemplary implementation of this aspect is a multimedia player object D 170 residing in a trusted multimedia process. In a protected memory architecture, the client process 102 and the multimedia process (a server process 104) cannot access each other's memory spaces. By implementing this aspect, the client process 102 can control the multimedia player object 170 by calling a play or stop function. To enable the multimedia player object 170 to start playing the media (e.g., music or video), the client process 102 provides the multimedia player with a reference to the multimedia data block 174 residing on a file system memory domain 172 which the multimedia player object 170 can directly invoke and access 176. In one aspect, the multimedia player object 170 is given the authority to invoke and access the object E 174 within the file system memory domain 172 by the data block reference that is sent to the multimedia player object 170 through the system call 116 issued by the client process 102.

Figure 10:
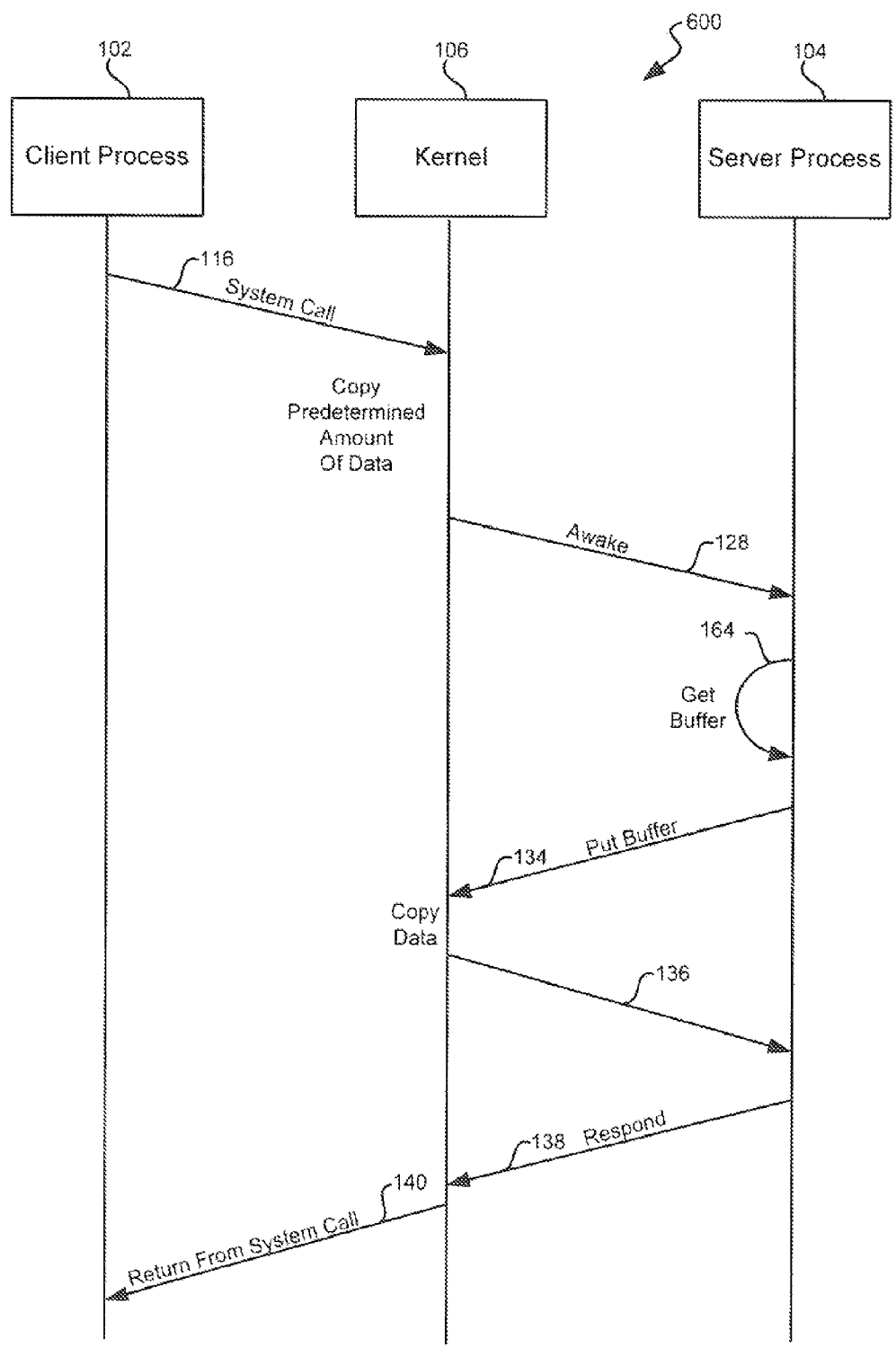
FIG. 10 is an invoke flow diagram of communications among processes in an alternative aspect.
Figure 11:
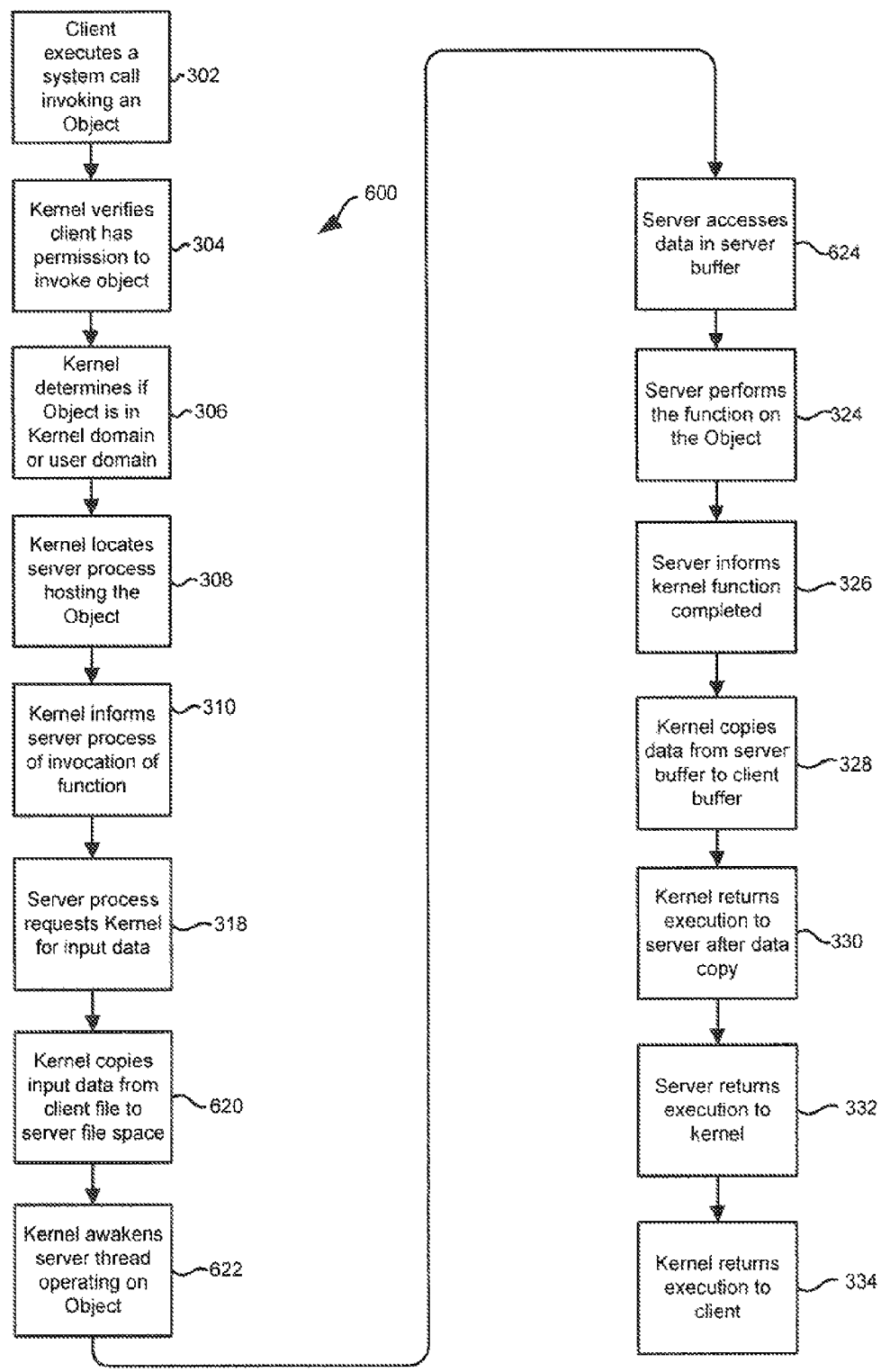
FIG. 11 is a process flow diagram of an example method for implementing the aspect illustrated in FIG. 10, according to one aspect.

Another aspect is illustrated in FIGS. 10 and 11 in which a relatively large input data block can be efficiently provided to an invoked remote object. This implementation can provide efficient invocation of remote objects which act on large input data blocks. FIG. 10 is an invoke flow diagram of this aspect process 600, while FIG. 11 is a process flow diagram of the process 600. Since several of the steps are similar to those described above with reference to FIG. 3, those descriptions are incorporated here for like numbered steps illustrated in FIG. 11.

Referring to FIGS. 10 and 11 together, the client process 102 executes a system call 116 to the kernel 106, step 302. The system call 116 provides the kernel 106 with the object identifier of the remote object, pointers to the region of memory of the client process 102 in which the input data resides, and pointers to the region in the client process 102 memory into which data outputted by the server process 104 is to be copied. In response, the kernel 106 validates the system call (i.e., confirming the client process is permitted to invoke the object), step 304, and locates the server process 104 hosting the object being invoked, step 306.

Before awakening the server process 104, the kernel 106 copies a predetermined amount of data from the client process's 102 memory space into a pre-designated memory region within the server process 104 memory space, step 620. In one aspect, the kernel 106 and the server process 104 can negotiate to designate a region of the server process 104 memory space to receive data to be copied directly from the client server 102 by the kernel 106. In one implementation, the data is copied with the assumption that the server process 104 will eventually call the kernel 106 to request that the remainder of the data not included in the predetermined amount of data initially copied into the server process 104. Such additional requests for input data may be accomplished by the server process 104 (or server proxy 148) issuing multiple Get Buffer 130 operations as described earlier with reference to FIG. 3 (steps 318-324).

Once the input data block has been copied into the server process 104 memory space, the kernel 106 awakens the invoked server thread by sending message 128, informing the client server of the request message sent by the client process 102, step 622. At this point, the server process 104 may call the server proxy 148 (if a proxy is implemented) to obtain the input data. With the input data preloaded into the server process 104 memory, the server process 104 or the server proxy 148 can obtain input data without having to execute a Get Input request to the kernel 106. Instead, the server process 104 or the server proxy 148 accesses the data in the server buffer, step 624. This aspect applies in particular to implementations and applications involving small buffers. In instances where larger buffers are used, the server process 104 or server proxy 148 may issue a Get Buffer 164 operation on the server process 104 memory. Thus, this aspect can substantially eliminate the need to request input data from the kernel, thereby reducing the number of required system calls to the kernel 106.

Once the server process 104 has completed the invoked thread, step 324, the server proxy 148 executes a Put Buffer request 134 requesting that the kernel 106 copy data contained within server process's 104 buffer into the client process's 102 output buffer, step 326. Once the kernel 106 directly copies the output data from the server process 102 buffer into the client process 104 output buffer, step 328, the kernel returns control of execution to the server process 104 by message 136, step 330. With the invoked operation completed, the server process 104 returns control of execution 138 to the kernel 106, step 332, prompting the kernel 106 to return control of execution 140 to the client process 102, step 334.

Figure 12:
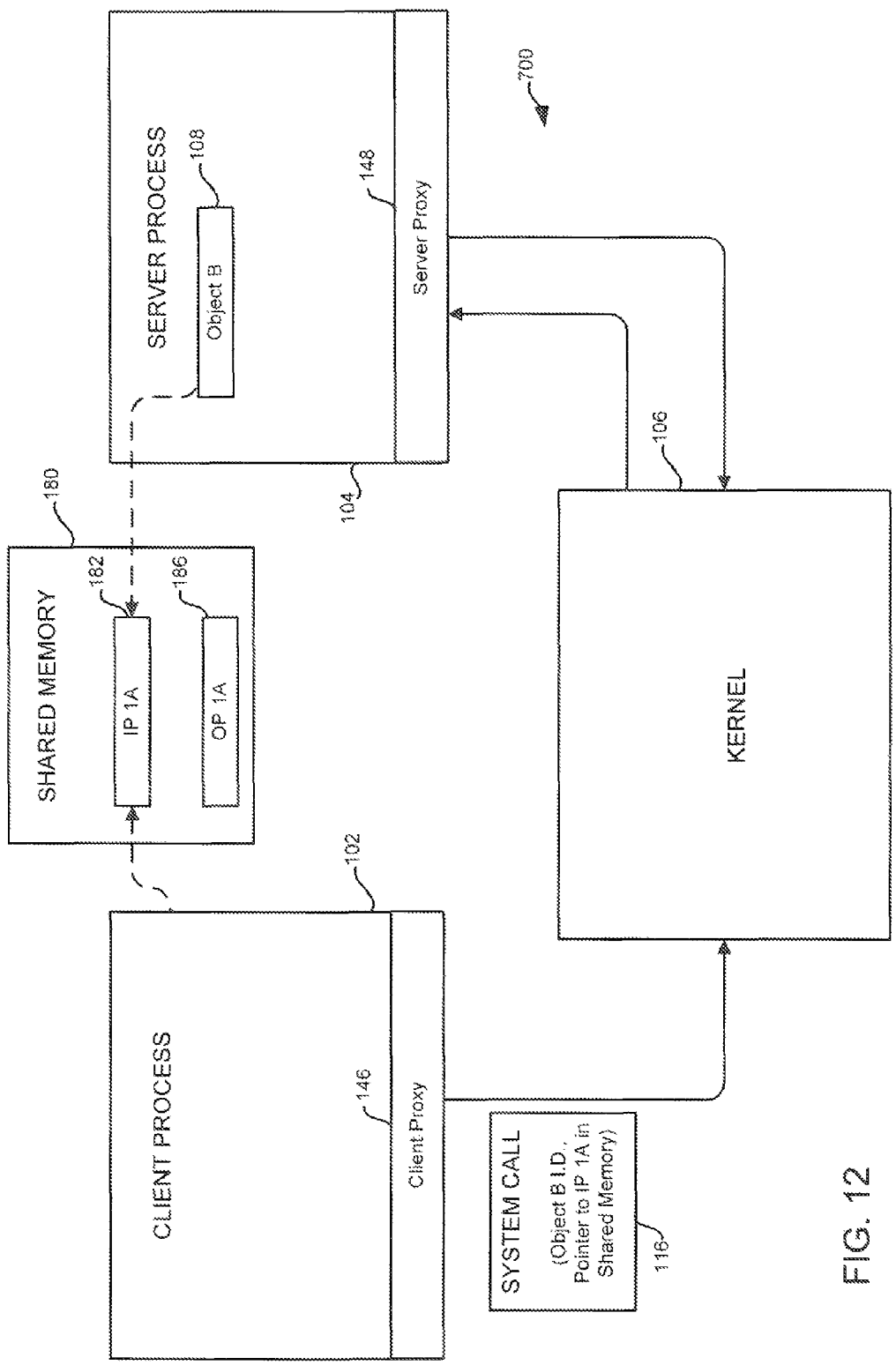
FIG. 12 is a schematic representation of a program state of a system during the client process's remote invocation of an object in which the client process and the server process share a memory region according to another aspect.
Figure 13:
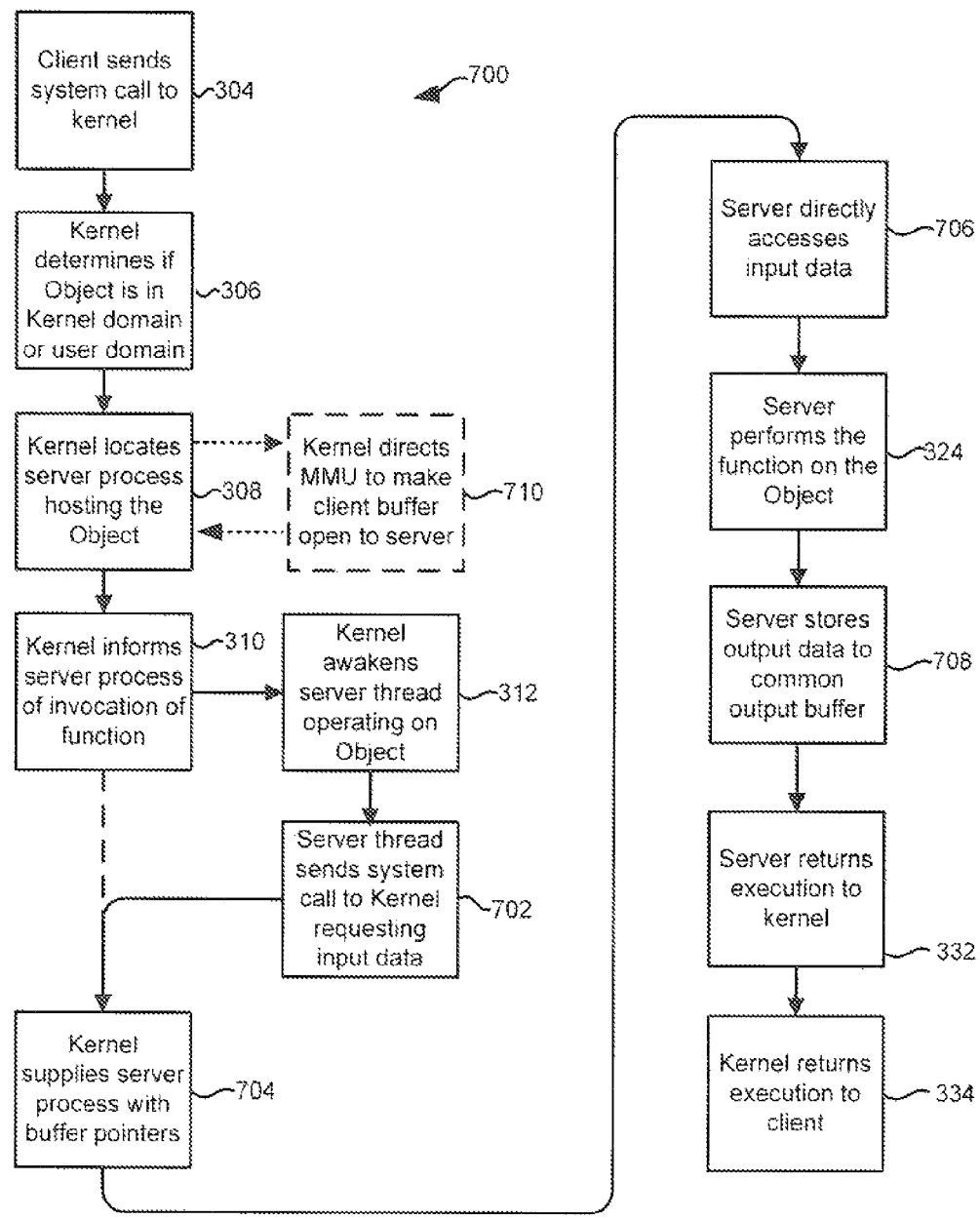
FIG. 13 is a process flow diagram of an example method for implementing the aspect illustrated in FIG. 12, according to one aspect.

FIGS. 12 and 13 illustrate another aspect which eliminates the need for copying data by the kernel 106 by using shared memory. Since several of the steps are similar to those described earlier with reference to FIG. 3, those descriptions are incorporated here for like numbered steps illustrated in FIG. 13.

Referring to FIGS. 12 and 13, the client process 102 input data IP 1A resides in an input buffer 182 within a shared memory space 180 that is accessible by both the client process 102 and the server process 104. The client process 102 may maintain the input data in the input buffer 182, or may copy the data into the input buffer 182 just prior to invoking a remote object. In operation, the client process 102 invokes a remote object B 108 residing in the server process 104 by executing a system call 116, step 302. The identifier of the object B 108 as well as the pointers to the buffers 182 and 184 are included in the system call 116. The kernel 106 validates the system call, step 304, determines where the object is located, steps 306 and 308, and then informs the server process 104 of the invocation request, step 310. In one aspect, the kernel may awaken the invoked server thread, step 312, which can send a request to the kernel 106 asking for input data, step 702. For example, the server process 104 may execute "Acquire In Ptr" and "Acquire Out Ptr" operations to obtain pointers to the data buffers. In response, the kernel 106 provides the server thread with the pointers to the input and output buffers 182 and 184, step 704. Alternatively, the kernel 106 can provide the server process 104 with pointers to the input and output buffers 182 and 187 without prompting, step 704. Since the server process 104 has the right to access the shared memory 180, and thus the input and output buffers 182 and 184 residing therein, the server process 104 can directly access the input data IP 1A within the buffer 182, step 706. This eliminates the overhead of the kernel 106 copying the data from the client process 102 to the server process 104. At this point, the server process 104 performs the invoked process, step 324. Upon completion, the server process 104 writes any output data directly into the output buffer 184 within the shared memory 180, step 708. At this point, the server process 104 returns control of execution to the kernel 106 indicating the function is complete, step 332, prompting the kernel 106 to return control of execution to the client process 102, step 334.

One of ordinary skill in the art will appreciate that the pointers to the input and output buffers 182 and 184 can be supplied to the server process 104 prior to awaking the process in a manner similar to that described previously with reference to FIG. 11, thereby reducing the number of requests that the server process 104 needs to send to the kernel 106.

In an optional variation of this aspect, the client process 102 can coordinate with the kernel 106 to establish a sharable memory region of client memory for each thread being invoked. For instance, the arguments included in the client process's system call 116 can designate (i.e., include pointers to) input and output data buffers located within a region of client memory to be made accessible to the invoked thread. In this aspect, the kernel 106 can direct a memory management unit (MMU) to make the indicated input and output data buffer portions of the client process 102 memory visible to the server process 104, step 710. For example, the data to be shared may be in a specific page in the client process 102 memory such that the MMU can grant the server process 104 access rights to the specific page. Typically, this access will be granted only for the duration of the system call. This may be accomplished by the kernel 106 requesting the MMU to remove the server process 104 access to the client process 102 memory upon receipt of a system call return from the server process 104.

Figure 14:
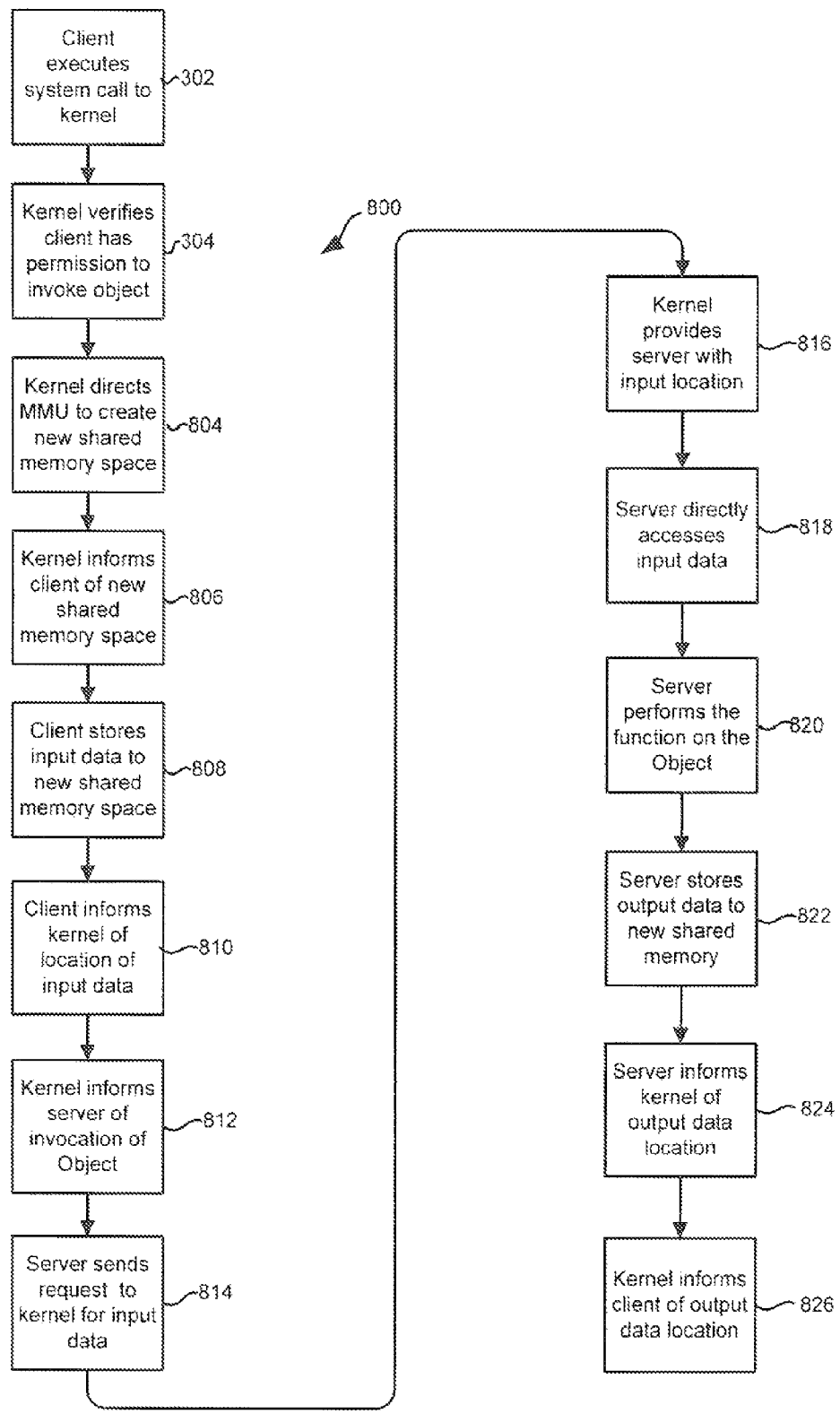
FIG. 14 is a process flow diagram of an alternative method for implementing the aspect illustrated in FIG. 12, according to one aspect.

In another variation of this aspect, as illustrated in FIG. 14, when the client process 102 and the server process 104 do not have access to the same region of memory, the kernel 106 can direct the MMU to make the client's buffer available to the server process 104 for the duration of the invocation. On initiation of the invocation, the kernel 106 can modify the virtual address space of the server process 104 to make one or more input buffers readable by the server process 104. Likewise, the kernel 106 can modify the virtual address space of the server process 104 to make one or more output buffers writable by the server process 104. This requires directing the MMU to map server process virtual addressees to the physical memory addresses in which the input or output buffers reside. The kernel 106 can then notify the server process 104 of the request to invoke the object, step 812. If the kernel notification did not include the location of the input data, the server process 104 could request the data from the kernel 106, step 814. In response, the kernel 106 provides the server process 104 with the location of the input data, step 816. At this point, the server process can directly access the input data from the newly mapped virtual memory addresses, step 818, and perform the invoked operation on the object, step 820, storing the resulting output into the new shared memory space, step 822. To complete the operation, the server process 104 informs the kernel 106 of the location in the shared memory of the output data, step 824, which allows the kernel 106 to inform the client process of the output data location, step 826. Before returning control of execution to the client process 102, the kernel 106 will remove the virtual memory mappings that were put in place to make buffers available to the server process 104.

This implementation allows input and output data to be directly accessed by the processes, obviating the need for the kernel 106 to copy data across protection boundaries. This aspect has a number of advantages. A first advantage is that input and output data can be "moved" between a client process (i.e., a calling process) and a server process (i.e., a called process) without making any copies, with that copy step performed by the client process 102. A second advantage is that the server process need not predict the size and/or the location of inputs or retain a copy of the output data after returning to the client process. Instead, the server process 104 simply reads the input data directly and outputs data to a buffer within the client process domain. A third advantage is that the server process 104 does not need to have sufficient memory to hold all input or output arguments in the memory at the same time.

Figure 15:
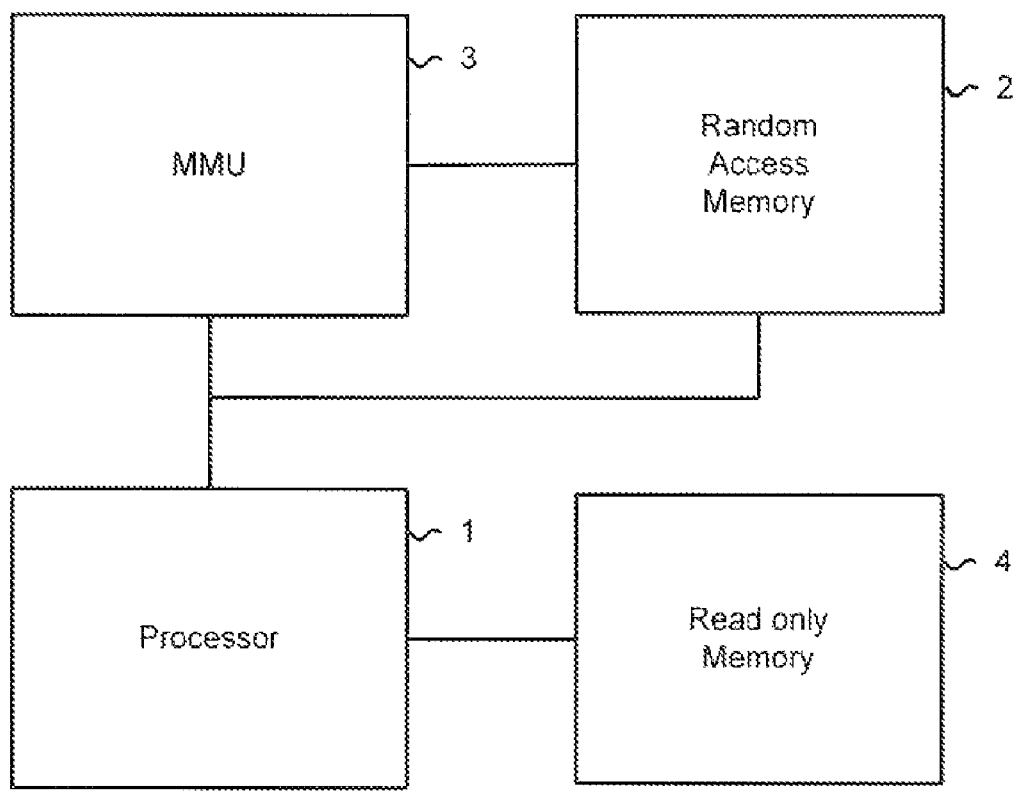
FIG. 15 is a system block diagram of a system suitable for implementing the various aspects.

The hardware used to implement the events of forgoing aspects may be processing elements and memory elements configured to execute a set of instructions, wherein the set of instructions are for performing method steps corresponding to the above events. Alternatively, some events may be performed by circuitry that is specific to a given function. FIG. 15 illustrates typical components of a system implementing the foregoing aspects. Such a system includes a processor 1 coupled to random access memory 2 and including a memory management unit (MMU) 3. The system may also include read only memory which may be used to store the kernel software instructions. In operation, the client process 102, server process 104 and kernel 106 exist as separate software instruction threads running on the processor 1 accessing the random access memory 2.

Figure 16:
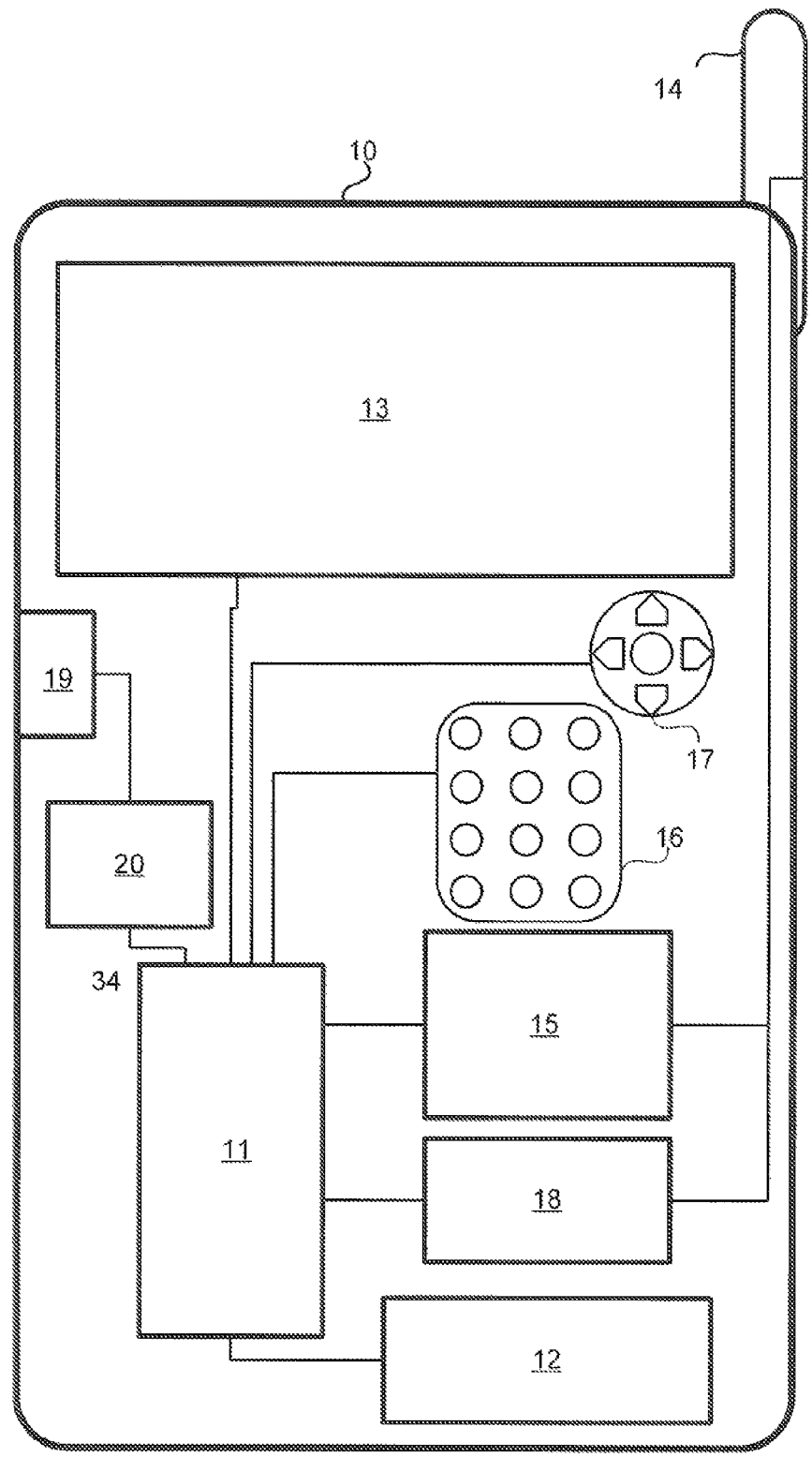
FIG. 16 is a component block diagram of a mobile handset implementation of the various aspects.

A particular implementation of the various aspects in a mobile handset is illustrated in FIG. 16. As noted earlier, the various aspects are particularly beneficial in a mobile handset due to its limited processor and memory capacity. A mobile handset 10 which may be any of a cellular telephone, multimedia Internet enabled cellular telephone, personal digital assistant, electronic music data block (e.g., MP3) player, and/or wireless electronic mail receiver. Such a mobile handset 10 may include a processor 11 coupled to memory 12 and a display 13. The mobile handset 10 may also include a number of data input/output interfaces, such as for example, a cellular telephone data receiver, a wired (e.g., FireWire) data link, a Bluetooth wireless data link, and infrared data link (not shown). For example, the mobile handset 10 may include an antenna 14 for receiving the electromagnetic signals from a wireless network transmitter/receiver node (not shown), and a wireless transceiver 15 connected to the antenna 14 for receiving the wireless signal and converting the signals into digital data that is relayed to the processor 11. Similarly, a Bluetooth or similar local wireless data link may include the antenna 14 (or another antenna not shown separately) connected to a WiFi, Bluetooth, WLAN, WiMax, etc. transceiver 18 which converts the received wireless signal into digital data that is relayed to the processor 11. Data may also be transmitted to and from the mobile handset 10 by means of a wired data link, such as a FireWire, USB, serial (e.g., RS-232), or Ethernet data link. For example, data may be transmitted by way of a FireWire data connector 19 coupled to a FireWire modem circuit 20 which converts data received from the connector 19 into digital data that is relayed to the processor 11. As is well known in the art, other wired data links would involve similar circuitry as suitable to the particular data link. It is worth noting that any of the data input and output devices within the mobile handset 10 may be accessed by a client process 102 as a server process in order to accomplish data communication functions.

The various aspects may be implemented by the processor 11 executing software instructions configured to implement one or more of the described methods. Such software instructions may be stored in memory 12 as the device's operating system, a series of APIs implemented by the operating system, or as compiled software implementing an embodiment method. Further, the software instructions may be stored on any form of tangible processor-readable memory, including: a random access memory 2 and 12 module, such as memory chip 2 and 12 within the system or an external memory chip such as a USB-connectable external memory (e.g., a "flash drive"); read only memory 4; hard disc memory device; a floppy disc; and a compact disc.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the aspects disclosed herein may be embodied directly in hardware, in a software module executed by a processor, or in a combination of the two. A software module may reside in processor readable memory which may be any of RAM memory, flash memory, ROM memory, EPROM memory, EEPROM memory, registers, hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

The various aspects offer a number of advantages over the prior art. The implementations enable input and output data to be moved between a calling (i.e., client) process and a called (i.e., server) process with a single copy, without incurring the limitations, complexity and additional overhead in previous system. For example, in the present implementations, a server process does not need to predict the size and/or location of data inputs. Further, the server process does not need to retain a copy of the output data after returning to the calling process. Also, the server process does not need to have enough memory to hold all the input or output arguments in memory at the same time. For a large class of functions, the various aspects reduce the data movement overhead of a microkernel architecture to zero, because the process-to-process copy can overlap copies that are implicit in the remote function. For example, when reading from a data block, the copy into the client process can move the memory from the file system cache to the client process buffer. Since this copy is implied by the remote "read" function, it would be required even when the caller resides in the same process.

The foregoing description of the various aspects/implementations is provided to enable any person skilled in the art to make or use the present disclosure. Various modifications to these aspects/implementations will be readily apparent to those skilled in the art, and the generic principles defined herein may be applied to other aspects/implementations without departing from the spirit or scope of the disclosure. Thus, the present disclosure is not intended to be limited to the aspects/implementations shown herein, and instead the claims should be accorded the widest scope consistent with the principles and novel features disclosed herein.

What is claimed is:

1. A method for accomplishing inter-process communication of data in a memory protection architecture having a kernel, comprising:

executing, in a kernel protection domain level process, a system call issued by a user protection domain level client process having a first memory address space not accessible to other user protection domain level processes, the system call including a first pointer referencing a memory location of a client input buffer in the first memory address space containing the input data and a second pointer referencing a memory location of a client output buffer in the first memory address space into which output data is to be copied, the system call requesting invocation of an object in an address space not accessible to the user protection domain level client process;

determining whether the object resides in the kernel protection domain level or in the user protection domain level;

identifying in the kernel protection domain level process a user protection domain level server process that contains a reference to a location of the object to be invoked, the identified user protection domain level server process having a second memory address space not accessible to other user protection domain level processes, the reference to the location being stored in the second memory address space;

copying the first pointer into a server input buffer in the second memory address space;

executing, in the kernel protection domain level process, an awake call to waken a server thread within the user protection domain level server process that invokes the object and outputs a result of the invocation in a server output buffer in the second memory address space as output data; and copying a third pointer referencing a memory location of the server output buffer containing output data directly from the server output buffer into the memory location of the client output buffer referenced by the second pointer.

2. The method of claim 1, wherein the system call is generated by a client proxy within the first memory address space.

3. The method of claim 1, wherein the system call includes an input parameter authorizing the object to invoke another object, or an output parameter that returns to the user protection domain level client process authority to invoke another object.

4. The method of claim 1, further comprising:

executing, in the kernel protection domain level process, a request to provide the user protection domain level server process with a readable memory address for direct access to the client input buffer; and executing in the kernel protection domain level process a request to provide the user protection domain level server process with a writable memory address for direct access to the client output buffer, wherein the kernel protection domain level process satisfies the requests upon verifying that the server process has the appropriate kind of access to the memory specified by the user protection domain level client process.

5. A computer system operating with a memory protection architecture, the computer system comprising:

a memory;

a processor coupled to the memory and implementing processor executable instructions including a kernel protection domain level process, a user protection domain level client process having a first memory address space not accessible to other user protection domain level processes, and a user protection domain level server process having a second memory address space not accessible to other user protection domain level processes, wherein the kernel protection domain level process has memory read write access to the first and second memory address spaces, wherein the processor is configured with software instructions to perform steps comprising:

executing, in the kernel protection domain level process, a system call by the user protection domain level client process, the system call including a first pointer referencing a memory location of a client input buffer in the first memory address space containing the input data and a second pointer referencing a memory location of a client output buffer in the first memory address space into which output data is to be copied, the system call requesting invocation of an object in an address space not accessible to the user protection domain level client process;

determining whether the object resides in the kernel protection domain level or in the user protection domain level;

identifying in the kernel protection domain level process a user protection domain level server process that contains a reference to a location of the object to be invoked, the identified user protection domain level server process having a second memory address space not accessible to other user protection domain level processes, the reference to the location being stored in the second memory address space;

copying the first pointer into a server input buffer in the second memory address space;

executing, in the kernel protection domain level process, an awake call to waken a server thread within the user protection domain level server process that invokes the object and outputs a result of the invocation in a server output buffer in the second memory address space as output data; and copying a third pointer referencing a memory location of the server output buffer containing the output data directly from the server output buffer into the memory location of the client output buffer referenced by the second pointer.

6. The computer system of claim 5, wherein the processor is configured with software instructions so the system call is generated by a client proxy within the first address space.

7. The computer system of claim 5, wherein the processor is configured with software instructions so the system call includes an input parameter authorizing the object to invoke another object, or an output parameter that returns to the user protection domain level client process authority to invoke another object.

8. The computer system of claim 5, wherein the processor is further configured with software instructions to perform steps comprising:

executing, in the kernel protection domain level process, a request to provide the user protection domain level server process with a readable memory address for direct access to the client input buffer; and executing, in the kernel protection domain level process, a request to provide the user protection domain level server process with a writable memory address for direct access to the client output buffer, wherein the kernel protection domain level process satisfies the requests upon verifying that the server process has the appropriate kind of access to the memory specified by the user protection domain level client process.

9. A mobile communications device operating with a memory protection architecture, the mobile communications device comprising:

a transceiver configured to send and receive communication signals to and from a communications network;

a memory;

a processor coupled to the transceiver and memory and implementing processor executable instructions including a kernel protection domain level process, a user protection domain level client process having a first memory address space not accessible to other user protection domain level processes, and a user protection domain level server process having a second memory address space not accessible to other user protection domain level processes, wherein the kernel protection domain level process has memory read write access to the first and second memory address spaces, wherein the processor is configured with processor-executable instructions to perform operations comprising:

executing, in the kernel protection domain level process, a system call by the user protection domain level client process, the system call including a first pointer referencing a memory location of a client input buffer in the first memory address space containing the input data and a second pointer referencing a memory location of a client output buffer in the first memory address space into which output data is to be copied, the system call requesting invocation of an object in an address space not accessible to the user protection domain level client process;

determining whether the object resides in the kernel protection domain level or in the user protection domain level;

identifying, in the kernel protection domain level process a user protection domain level server process that contains a reference to a location of the object to be invoked, the identified user protection domain level server process having a second memory address space not accessible to other user protection domain level processes, the reference to the location being stored in the second memory address space;

copying the first pointer into a server input buffer in the second memory address space;

executing, in the kernel protection domain level process, an awake call to waken a server thread within the user protection domain level server process that invokes the object and outputs a result of the invocation in a server output buffer in the second memory address space as output data; and copying a third pointer referencing a memory location of the server output buffer containing the output data directly from the server output buffer into the memory location of the client output buffer referenced by the second pointer.

10. The mobile communications device of claim 9, wherein the processor is configured with processor-executable instructions so the system call is generated by a client proxy within the first memory address space.

11. The mobile communications device of claim 9, wherein the processor is configured with processor-executable instructions so the system call includes an input parameter authorizing the object to invoke another object, or an output parameter that returns to the user protection domain level client process authority to invoke another object.

12. The mobile communications device of claim 9, wherein the processor is configured with processor-executable instructions to perform operations comprising:

executing, in the kernel protection domain level process, a request to provide the user protection domain level server process with a readable memory address for direct access to the client input buffer; and executing, in the kernel protection domain level process, a request to provide the user protection domain level server process with a writable memory address for direct access to the client output buffer, wherein the kernel protection domain level process satisfies the requests upon verifying that the user protection domain level server process has the appropriate kind of access to the memory specified by the user protection domain level client process.

13. A non-transitory processor-readable memory having stored thereon processor executable instructions configured to cause a processor coupled to a memory to perform operations comprising:

executing, in a kernel protection domain level process, a system call issued by a user protection domain level client process having a first memory address space not accessible to other user protection domain level processes, the system call including a first pointer referencing a memory location of a client input buffer in the first memory address space containing the input data and a second pointer referencing a memory location of a client output buffer in the first memory address space into which output data is to be copied, the system call requesting invocation of an object in an address space not accessible to the user protection domain level client process;

determining whether the object resides in the kernel protection domain level or in the user protection domain level;

identifying, in the kernel protection domain level process, a user protection domain level server process that contains a reference to a location of the object to be invoked, the identified user protection domain level server process having a second memory address space not accessible to other user protection domain level processes, the reference to the location being stored in the second memory address space;

copying the first pointer into a server input buffer in the second memory address space;

executing, in the kernel protection domain level process, an awake call to waken a server thread within the user protection domain level server process that invokes the object and outputs a result of the invocation in a server output buffer in the second memory address space as output data; and copying a third pointer referencing a memory location of the server output buffer containing the output data directly from the server output buffer into the memory location of the client output buffer referenced by the second pointer.

14. The non-transitory processor-readable memory of claim 13, wherein the stored processor executable instructions are further configured so that the system call is generated by a client proxy within the first memory location address space.

15. The non-transitory processor-readable memory of claim 13, wherein the stored processor executable instructions are configured so that the system call includes an input parameter authorizing the object to invoke another object, or an output parameter that returns to the user protection domain level client process authority to invoke another object.

16. The non-transitory processor-readable memory of claim 13, wherein the stored processor executable instructions are further configured to cause the processor to perform operations further comprising:

executing, in the kernel protection domain level process, a request to provide the user protection domain level server process with a readable memory address for direct access to the client input buffer; and executing, in the kernel protection domain level process, a request to provide the user protection domain level server process with a writable memory address for direct access to the client output buffer, wherein the kernel protection domain level process satisfies the requests upon verifying that the user protection domain level server process has the appropriate kind of access to the memory specified by the user protection domain level client process.

17. A system, comprising:

means for executing, in a kernel protection domain level process, a system call issued by a user protection domain level client process having a first memory address space not accessible to other user protection domain level processes, the system call including a first pointer referencing a memory location of a client input buffer in the first memory address space containing the input data and a second pointer referencing a memory location of a client output buffer in the first memory address space into which output data is to be copied, the system call requesting invocation of an object in an address space not accessible to the user protection domain level client process;

means for determining whether the object resides in the kernel protection domain level or in the user protection domain level;

means for identifying in the kernel protection domain level process a user protection domain level server process that contains a reference to a location of the object to be invoked, the identified user protection domain level server process having a second memory address space not accessible to other user protection domain level processes, the reference to the location being stored in the second memory address space;

means for copying the first pointer into a server input buffer in the second memory address space;

means for executing, in the kernel protection domain level process, an awake call to waken a server thread within the user protection domain level server process that invokes the object and outputs a result of the invocation in a server output buffer in the second memory address space as output data; and means for copying a third pointer referencing a memory location of the server output buffer containing the output data directly from the server output buffer into the memory location of the client output buffer referenced by the second pointer.

18. The system of claim 17, wherein means for executing, in a kernel protection domain level process, a system call issued by a user protection domain level client process comprises means for executing a system call generated by a client proxy within the first memory address space.

19. The system of claim 17, wherein means for executing, in a kernel protection domain level process, a system call issued by a user protection domain level client process comprises means for executing a system call that includes an input parameter authorizing the object to invoke another object, or an output parameter that returns to the user protection domain level client process authority to invoke another object.

20. The system of claim 17, further comprising:

means for executing in the kernel protection domain level process a request to provide the user protection domain level server process with a readable memory address for direct access to the client input buffer; and means for executing in the kernel protection domain level process a request to provide the user protection domain level server process with a writable memory address for direct access to the client output buffer, wherein the kernel protection domain level process satisfies the requests upon verifying that the server process has the appropriate kind of access to the memory specified by the user protection domain level client process.

* * * * *